US012784621B2

(12) United States Patent
Park et al.

(10) Patent No.: US 12,784,621 B2
(45) Date of Patent: Nov. 3, 2026

(54) METHOD FOR REPAIRING DISPLAY PANEL AND DISPLAY PANEL REPAIRED BY USING THE SAME

(71) Applicant: Samsung Display Co., Ltd., Yongin-Si (KR)

(72) Inventors: Youngwoo Park, Yongin-si (KR); Sungwook Kim, Yongin-si (KR); Jeonggi Kim, Yongin-si (KR); Taesik Kim, Yongin-si (KR); Jeong-Soo Lee, Yongin-si (KR); Jina Lee, Yongin-si (KR); Wan-Soon Im, Yongin-si (KR); Seongbaik Chu, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 211 days.

(21) Appl. No.: 18/502,123

(22) Filed: Nov. 6, 2023

(65) Prior Publication Data

US 2024/0274049 A1 Aug. 15, 2024

(30) Foreign Application Priority Data

Feb. 9, 2023 (KR) ........................ 10-2023-0017606

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2330/10* (2013.01); *G09G 2330/12* (2013.01)

(58) Field of Classification Search
CPC ...... G09G 3/006; G09G 3/32; G09G 2330/10; G09G 2330/12; G09G 3/3233; G09G 2300/0426; G09G 2300/0439; G09G 2310/061; G09G 2330/08; H10K 59/131; H10K 59/353
See application file for complete search history.

(56) References Cited

U.S. PATENT DOCUMENTS 6,275,061 B1 * 8/2001 Tomita .................. G09G 3/006 324/760.02
7,838,881 B2 * 11/2010 Tsubata ............ G02F 1/134336 438/34
8,101,432 B2 * 1/2012 Oohata .................. H01L 24/82 257/74
9,711,585 B2 7/2017 Kim et al.
(Continued)

FOREIGN PATENT DOCUMENTS

KR 10-2150022 B1 9/2020
KR 10-2294834 B1 8/2021
(Continued)

*Primary Examiner* — Akm Zakaria
(74) *Attorney, Agent, or Firm* — Innovation Counsel LLP

(57) ABSTRACT

Provided are a method for repairing a display panel and a display panel repaired by using the same. The method for repairing a display panel of the inventive concept includes inspecting a display panel including pixels arranging along a first direction and a second direction crossing the first direction to detect a defective pixel among the pixels, and cutting an initialization voltage line disposed between the defective pixel detected in the detecting of a defective pixel and pixels disposed adjacent to the defective pixel to isolate the defective pixel from the initialization voltage line.

20 Claims, 16 Drawing Sheets

(56) References Cited

U.S. PATENT DOCUMENTS

| | | | | |
|---|---|---|---|---|
| 9,754,532 | B2 | 9/2017 | Park et al. | |
| 9,966,004 | B2 | 5/2018 | Shin et al. | |
| 11,621,314 | B2 | 4/2023 | Kim et al. | |
| 2005/0094081 | A1* | 5/2005 | Lee | G02F 1/136259 349/141 |
| 2010/0015876 | A1* | 1/2010 | Kang | H10K 71/00 445/2 |
| 2017/0092166 | A1* | 3/2017 | Choi | H10K 59/80521 |
| 2017/0098398 | A1* | 4/2017 | Amatsuchi | G01R 31/26 |
| 2023/0162674 | A1* | 5/2023 | Song | G09G 3/3233 345/206 |
| 2023/0200195 | A1* | 6/2023 | Kim | H10K 59/38 257/40 |

FOREIGN PATENT DOCUMENTS

| | | | |
|---|---|---|---|
| KR | 10-2022-0030499 | A | 3/2022 |
| KR | 10-2381288 | B1 | 3/2022 |

* cited by examiner

METHOD FOR REPAIRING DISPLAY PANEL AND DISPLAY PANEL REPAIRED BY USING THE SAME

CROSS-REFERENCE TO RELATED APPLICATIONS

This U.S. non-provisional patent application claims priority under 35 U.S.C. § 119 to Korean Patent Application No. 10-2023-0017606, filed on Feb. 9, 2023, the entire contents of which are hereby incorporated by reference.

BACKGROUND

The present disclosure herein relates to a method for repairing a display panel and a display panel repaired by using the same.

Display devices such as televisions, mobile phones, tablets, navigation system units, and game consoles provide images to users through a display screen and include a display panel including a plurality of pixels. Each of the pixels may include a light emitting element for generating light and a circuit unit for controlling the amount of current flowing through the light emitting element. However, when a leakage current is generated in the circuit unit of any one pixel among the pixels, it affects circuit units of adjacent pixels, so that the display quality of the display panel may be degraded.

SUMMARY

The present disclosure provides a method for repairing a display panel for preventing a problem in which the voltage of adjacent pixels rises due to the circuit unit of a damaged pixel. The present disclosure also provides a display panel repaired by the repair method of the inventive concept, thereby being prevented from having degraded display quality.

An embodiment of the inventive concept provides a method for repairing a display panel, the method including inspecting a display panel including pixels arranging along a first direction and a second direction crossing the first direction to detect a defective pixel among the pixels, and cutting an initialization voltage line disposed between the defective pixel detected in the detecting of a defective pixel and pixels disposed adjacent to the defective pixel to isolate the defective pixel from the initialization voltage line.

In an embodiment, the display panel may include an initialization voltage line electrically connected to the pixels to apply the initialization voltage, and each of the pixels may include a circuit unit including transistors and a capacitor, and a light emitting element electrically connected to the circuit unit. In an embodiment, among the transistors, an initialization transistor may include a semiconductor pattern connected to the initialization voltage line.

In an embodiment, the initialization voltage line may include a first initialization voltage line portion formed as a single body with the semiconductor pattern of the initialization transistor, and a second initialization voltage line portion intersecting the first initialization voltage line portion in a plan view and electrically connected to the first initialization voltage line portion. In an embodiment, the cut portion may be formed such that a portion connected to the semiconductor pattern of the initialization transistor of the defective pixel from the first initialization voltage line portion is cut.

In an embodiment, the semiconductor pattern of the initialization transistor of the defective pixel may extend from the initialization voltage line, and the cut portion may be formed such that a portion of the semiconductor pattern of the defective pixel is cut.

In an embodiment of the inventive concept, a display panel includes pixel units each including at least one pixel, and arranged along a first direction and a second direction intersecting the first direction, and an initialization voltage line electrically connected to the pixels of the pixel units to apply an initialization voltage. In an embodiment, in a first pixel among the pixels, the initialization voltage line connected to the first pixel includes a cut portion.

In an embodiment, the initialization voltage line may include first initialization voltage line portions extending in the first direction and arranged in the second direction, and second initialization voltage line portions extending in the second direction and arranged in the first direction and electrically connected to the first initialization voltage line portions.

In an embodiment, the first initialization voltage line portions and the second initialization voltage line portions may be disposed on different layers, respectively.

In an embodiment, the first initialization voltage line portions and the second initialization voltage line portions may include different materials.

In an embodiment, the electrical conductivity of the second initialization voltage line portions may be greater than the electrical conductivity of the first initialization voltage line portions.

In an embodiment, each of the pixels may include a circuit unit including transistors and a capacitor, and a light emitting element electrically connected to the circuit unit, wherein an initialization transistor among the transistors may include a semiconductor pattern connected to a corresponding first initialization voltage line portion among the first initialization voltage line portions.

In an embodiment, the corresponding first initialization voltage line portion and the semiconductor pattern of the initialization transistor may be formed as a single body on the same layer.

In an embodiment, the pixel units may include pixel rows defined by pixel units arranged along the first direction among the pixel units, and the first initialization voltage line portions may be respectively disposed in the pixel rows.

In an embodiment, the pixel units may include pixel columns arranged along the second direction among the pixel units, and the second initialization voltage line portions may be respectively disposed in n number of pixel columns, where the n may be a natural number of 1 or greater.

In an embodiment, any one first initialization voltage line portion among the first initialization voltage line portions may be connected to a pixel row including the first pixel among the pixel rows, and the cut portion may be formed in the any one first initialization voltage line portion.

In an embodiment, the cut portion may include a first cut portion and a second cut portion which are formed by cutting a portion of the any one first initialization voltage line portion, and a line portion positioned between the first cut portion and the second cut portion may be connected to the first pixel.

In an embodiment, the first pixel may be electrically insulated from the any one first initialization voltage line portion by the first cut portion and the second cut portion.

In an embodiment, the initialization transistor of the first pixel may include a semiconductor pattern extending from any one first initialization voltage line portion among the first initialization voltage line portions, and the cut portion may be formed in a portion of the semiconductor pattern of the first pixel. In an embodiment, the first pixel may be electrically insulated from the any one first initialization voltage line portion by the cut portion.

In an embodiment, each of the circuit units of the pixels of the pixel units may include a semiconductor pattern layer including the first initialization voltage line portions, and a conductive pattern layer disposed on the semiconductor pattern layer and including the second initialization voltage line portions, wherein the cut portion may be disposed not to overlap the conductive pattern layer in a plan view.

In an embodiment, the display panel may further include a driving voltage line extending in the second direction and electrically connected to the pixels of the pixel units to apply a driving voltage, wherein the driving voltage line and the second initialization voltage line portions may be disposed on the same layer.

In an embodiment, the driving voltage line may be arranged spaced apart from the second initialization voltage line portions in the first direction.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
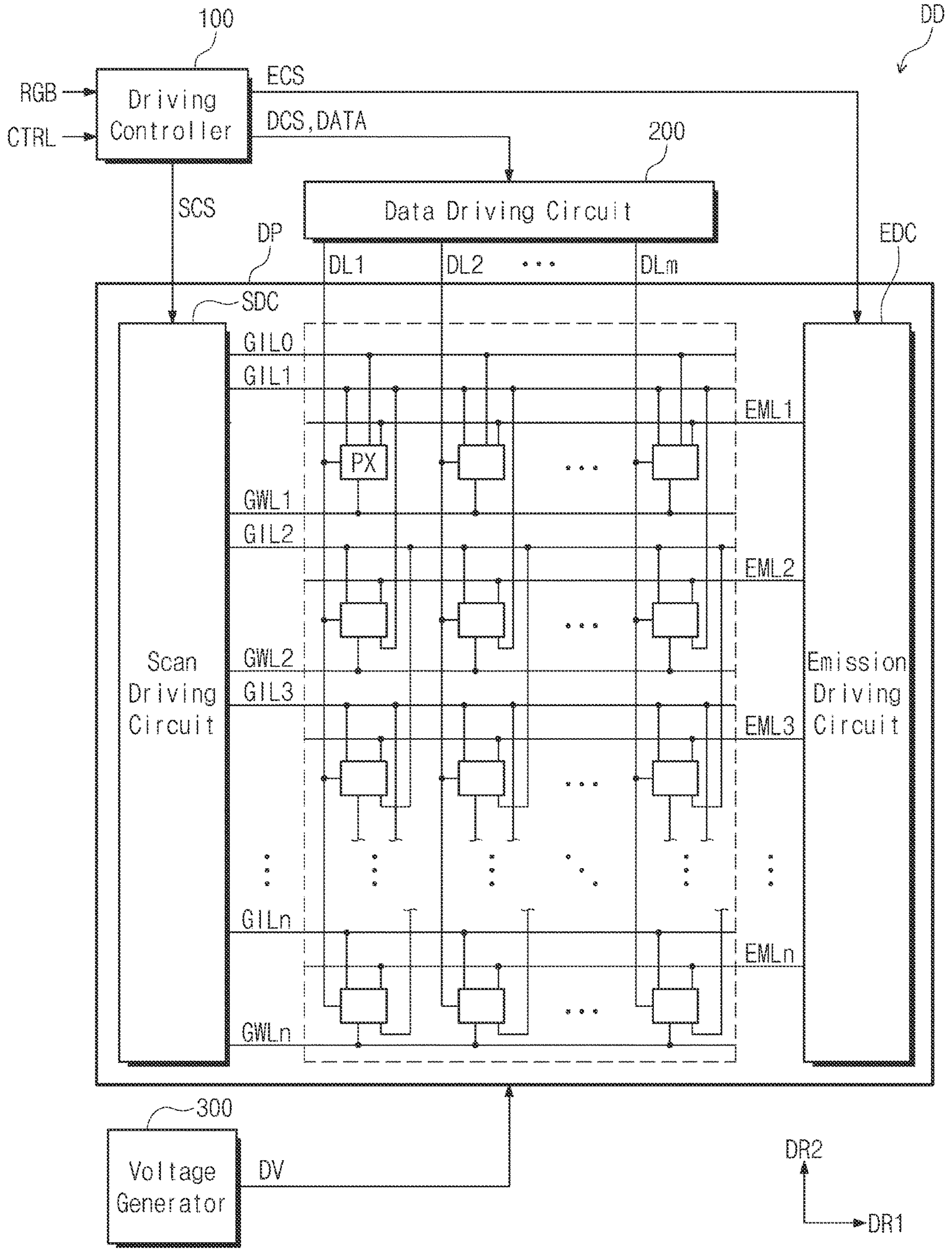
FIG. 1 is a block diagram of a display device according to an embodiment of the inventive concept.

The inventive concept may be modified in many alternate forms, and thus specific embodiments will be exemplified in the drawings and described in detail. It should be understood, however, that it is not intended to limit the inventive concept to the particular forms disclosed, but rather, is intended to cover all modifications, equivalents, and alternatives falling within the spirit and scope of the inventive concept.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or" includes any and all combinations of one or more of which associated elements may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of the elements shown in the drawings. The terms are used as a relative concept and are described with reference to the direction indicated in the drawings.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, a pixel and a display panel according to an embodiment of the inventive concept will be described with reference to the accompanying drawings.

FIG. 1 is a block diagram of a display device DD according to an embodiment of the inventive concept.

The display device DD may be a device which is activated in response to an electrical signal and displays images. For example, the display device DD may be a large-sized device such as a television and an external billboard as well as a small-and-medium-sized device such as a monitor, a mobile phone, a tablet, a navigation system unit, and a game console. However, the above-described embodiments of the display device DD are only exemplary, and the inventive concept is not limited to any one embodiment as long as the embodiments do not depart from the inventive concept.

Referring to FIG. 1, the display device DD may include a display panel DP, a driving controller 100, a scan driving circuit SDC, an emission driving circuit EDC, a data driving circuit 200, and a voltage generator 300. The driving controller 100, the scan driving circuit SDC, an emission driving circuit EDC, and the data driving circuit 200 may each be provided in the form of a driving chip and electrically connected to the display panel DP, or may be directly formed in the display panel DP without being limited thereto.

The driving controller 100 may receive an image input signal RGB and a control signal CTRL. The image input signal RGB and the control signal CTRL may be provided from a main controller (or a graphic processor).

The driving controller 100 may generate an image data signal DATA obtained by converting data format of the image input signal RGB to meet interface specifications of the data driving circuit 200. The driving controller 100 may output a scan control signal SCS, a data control signal DCS, and an emission control signal ECS.

The data driving circuit 200 may receive the data control signal DCS and the image data signal DATA from the driving controller 100. The data driving circuit 200 may convert the image data signal DATA into data signals, and may output the data signals to a plurality of data lines DL1 to DLm. The data signals may be analog voltages corresponding to gray scale values of the image data signal DATA.

The voltage generator 300 may generate voltages necessary for the operation of the display panel DP. In an embodiment, the voltage generator 300 may generate driving voltages DV. The driving voltages DV may include a plurality of voltages which have different voltage levels from each other. For example, the driving voltages DV may include a first driving voltage ELVDD (see FIG. 2), a second driving voltage ELVSS (see FIG. 2), and an initialization voltage VINT (see FIG. 2), all of which are to be described later. However, embodiments of the driving voltages DV are not limited thereto.

The display panel DP according to an embodiment of the inventive concept may be a light emitting type display panel, but is not particularly limited thereto. For example, the display panel DP may be an organic light emitting display panel, an inorganic light emitting display panel, or a quantum dot light emitting display panel. A light emitting layer of the organic light emitting display panel may include an organic light emitting material, and a light emitting layer of the inorganic light emitting display panel may include an inorganic light emitting material. A light emitting layer of the quantum dot light emitting display panel may include a quantum dot, a quantum load, and the like. Hereinafter, the display panel DP will be described as an organic light emitting display panel.

The display panel DP may include first scan lines GIL0 to GILn, second scan lines GWL1 to GWLn, emission control lines EML1 to EMLn, data lines DL1 to DLm, and pixels PX. The display panel DP may include a scan driving circuit SDC and an emission driving circuit EDC which are directly formed in the display panel DP. However, the embodiment of the inventive concept is not limited thereto and at least one of the scan driving circuit SDC or the emission driving circuit EDC may be provided in the form of a driving chip and electrically connected to the display panel DP.

In an embodiment illustrated in FIG. 1, the scan driving circuit SDC and the emission driving circuit EDC are disposed to be spaced apart with the pixels PX interposed therebetween, and are provided as separate driving circuits distinguishable from each other, but the embodiment is not limited thereto. For example, the scan driving circuit SDC and the emission driving circuit EDC may be configured as one driving circuit.

The first scan lines GIL0 to GILn and the second scan lines GWL1 to GWLn may extend along a first direction DR1 and electrically connected to the scan driving circuit SDC. The emission control lines EML1 to EMLn may extend along the first direction DR1 and electrically connected to the emission driving circuit EDC. The first scan lines GIL0 to GILn, the second scan lines GWL1 to GWLn, and the emission control lines EML1 to EMLn may be arranged spaced apart from each other in a second direction DR2.

The data lines DL1 to DLm may extend along the second direction DR2 and connected to the data driving circuit 200. The data lines DL1 to DLm may be arranged spaced apart from each other in the first direction DR1.

The pixels PX may each be electrically connected to corresponding signal lines among the first scan lines GIL0 to GILn, the second scan lines GWL1 to GWLn, the emission control lines EML1 to EMLn, and the data lines DL1 to DLm. However, the embodiment of the pixels PX illustrated in FIG. 1 is only exemplary, and the type and number of signal lines connected to the pixels PX are not limited thereto.

The scan driving circuit SDC may receive the scan control signal SCS from the driving controller 100. In response to the scan control signal SCS, the scan driving circuit SDC may output first scan signals to the first scan lines GIL0 to GILn, and may output second scan signals to the second scan lines GWL1 to GWLn.

The emission driving circuit EDC may receive the emission control signal ECS from the driving controller 100. In response to the emission control signal ECS, the emission driving circuit EDC may output emission signals to the emission control lines EML1 to EMLn.

Figure 2:
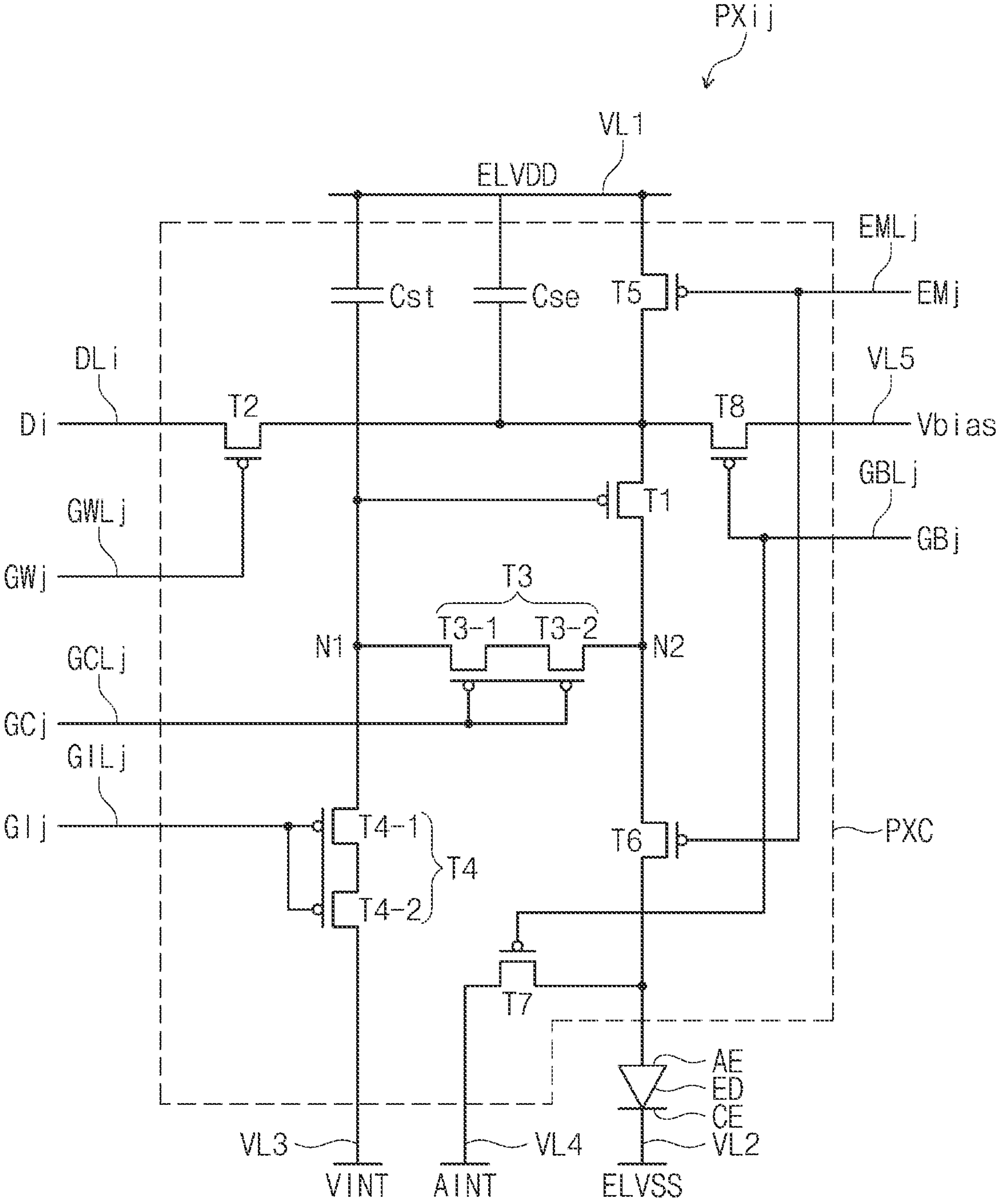
FIG. 2 is an equivalent circuit diagram of a pixel according to an embodiment of the inventive concept.

Each of the pixels PX constituting the display panel DP may include a light emitting element ED (see FIG. 2) and a circuit unit PXC (see FIG. 2) for controlling emission of the light emitting element ED (see FIG. 2). The circuit unit PXC (see FIG. 2) may include a plurality of transistors and at least one capacitor. At least one of the scan driving circuit SDC or the emission driving circuit EDC may include transistors formed through the same process as the process through which the circuit unit PXC (see FIG. 2) of the pixels PX is formed.

The pixels PX may be provided with data voltages in response to scan signals. The pixels PX may display an image by emitting light of luminance corresponding to the data voltages in response to emission signals. The emission duration of the pixels PX may be controlled by the emission signals. As a result, the display panel DP may output an image through the pixels PX.

The pixels PX may include pixels emitting light of different colors from each other. For example, the pixels PX may include red pixels configured to output red light, green pixels configured to output green light, and blue pixels configured to output blue light, and each of the pixel units may include a red pixel, a green pixel, and a blue pixel. Light emitting layers of a light emitting element of the red pixel, a light emitting element of the green pixel, and a light emitting element of the blue pixel may be respectively formed of different materials. However, the embodiment of the inventive concept is not necessarily limited thereto.

FIG. 2 is an equivalent circuit diagram of a pixel PXij according to an embodiment of the inventive concept.

FIG. 2 exemplarily illustrates an equivalent circuit diagram of the pixel PXij connected to an i-th data line DLi among the data lines DL1 to DLm (see FIG. 1), a j-th first scan line GILj among the first scan lines GIL0 to GILn (see FIG. 1), a j-th second scan line GWLj among the second scan lines GWL1 to GWLn (see FIG. 1), a j-th third scan line GCLj among third scan lines, a j-th fourth scan line GBLj among fourth scan lines, and a j-th emission control line EMLj among the emission control lines EML1 to EMLn (see FIG. 1). Here, i and j represent natural numbers of 1 or greater.

Referring to FIG. 2, the pixel PXij may include the light emitting element ED, and the circuit unit PXC connected to the light emitting element ED. The circuit unit PXC may control the amount of current flowing through the light emitting element ED, and the light emitting element ED may emit light having a predetermined luminance according to the amount of current provided.

The circuit unit PXC may include first to eighth transistors T1 to T8 and at least one capacitor, and FIG. 2 exemplarily illustrates an embodiment including two capacitors Cst and Cse. Each of the first to eighth transistors T1 to T8 may be a transistor including a low-temperature polycrystalline silicon (LTPS) semiconductor layer or an oxide semiconductor layer. In addition, each of the first to eighth transistors T1 to T8 may be a P-type transistor or N-type transistor. In the present embodiment, each of the first to eighth transistors T1 to T8 is illustrated as a P-type transistor including a low-temperature polycrystalline silicon (LTPS) semiconductor layer, but this is only exemplary, and at least one among the first to eighth transistors T1 to T8 may be an N-type transistor including an oxide semiconductor layer, but is not limited to any one.

The j-th first scan line GILj, the j-th second scan line GWLj, the j-th third scan line GCLj, and the j-th fourth scan line GBLj may respectively transmit a j-th first scan signal GIj, a j-th second scan signal GWj, a j-th third scan signal GCj, and a j-th fourth scan signal GBj. The j-th emission control line EMLj may transmit an emission signal EMj, and the i-th data line DLi may transmit a data signal Di. The data signal Di may have a voltage level corresponding to the image input signal RGB (see FIG. 1) which is input to the display device DD (see FIG. 1).

First to fifth voltage lines VL1, VL2, VL3, VL4, and VL5 may respectively transmit the first driving voltage ELVDD, the second driving voltage ELVSS, a first initialization voltage VINT, a second initialization voltage AINT, and a bias voltage Vbias. In the present embodiment, the first and second voltage lines VL1 and VL2 may be respectively defined as first and second driving voltage lines, and the third and fourth voltage lines VL3 and VL4 may be respectively defined as first and second initialization voltage lines.

In the present embodiment, the light emitting element ED may be an organic light emitting element. The light emitting element ED may include an anode AE and a cathode CE. The anode AE of the light emitting element ED may be electrically connected to, via at least one transistor, the first voltage line VL1 to which the first driving voltage ELVDD is transmitted, and the cathode CE of the light emitting element ED may be electrically connected to the second voltage line VL2 to which the second driving voltage ELVSS is transmitted.

Each of the first to eighth transistors T1 to T8 may include a first electrode, a second electrode, and a gate electrode. According to an embodiment of the inventive concept, the first electrode and the second electrode may be respectively defined as an input electrode or an output electrode (or a source electrode or a drain electrode). In the present disclosure, “being electrically connected between a transistor and a signal line or between a transistor and a transistor” means that “an electrode of the transistor has a shape of a single body with the signal line, or is connected through a connection electrode.”

The first transistor T1 may be electrically connected between the first voltage line VL1 and the anode AE of the light emitting element ED. The first transistor T1 may include the first electrode electrically connected to the first voltage line VL1 via the fifth transistor T5, the second electrode electrically connected to a second node N2 to which the anode AE of the light emitting element ED is connected via the sixth transistor T6, and the gate electrode electrically connected to a first nod N1 to which the capacitor Cst is connected. The first transistor T1 may receive the data signal Di transmitted by the data line DLi in accordance with a switching operation of the second transistor T2, and supply a driving current to the light emitting element ED. In the present embodiment, the first transistor T1 may be defined as a driving transistor.

The second transistor T2 may be electrically connected between the data line DLj and the first electrode of the first transistor T1. The second transistor T2 may include the first electrode electrically connected to the data line DLi, the second electrode electrically connected to the first electrode of the first transistor T1, and the gate electrode electrically connected to the j-th second scan line GWLj. The second transistor T2 may be turned on according to the second scan signal GWj received through the j-th second scan line GWLj and transmit the data signal Di transmitted from the data line DLi to the first transistor T1. In the present embodiment, the second transistor T2 may be defined as a switching transistor.

The third transistor T3 may be electrically connected between the second electrode of the first transistor T1 and the gate electrode of the first transistor T1. The third transistor T3 may include the first electrode electrically connected to a first node N1, the second electrode electrically connected to a second node N2, and the gate electrode electrically connected to the j-th third scan line GCLj. That is, the first electrode of the third transistor T3 may be connected to the first node N1 which is electrically connected to the gate electrode of the first transistor T1, and the second electrode of the third transistor T3 may be connected to the second node N2 which is electrically connected to the second electrode of the first transistor T1.

The third transistor T3 may be turned on according to the third scan signal GCj received through the j-th third scan line GCLj and electrically connect the gate electrode of the first transistor T1 and the second electrode of the first transistor T1. That is, the first transistor T1 may be diode-connected by the third transistor T3. In the present embodiment, the third transistor T3 may be defined as a compensation transistor.

The third transistor T3 may include first and second sub-transistors T3-1 and T3-2. The first and second sub-transistors T3-1 and T3-2 may be connected in series between the first node N1 and the second node N2.

The first sub-transistor T3-1 may include a first electrode electrically connected to the first node N1, a second electrode connected to the second sub-transistor T3-2, and a gate electrode electrically connected to the j-th third scan line GCLj. The first electrode of the first sub-transistor T3-1 may correspond to the first electrode of the third transistor T3. The second sub-transistor T3-2 may include a first electrode connected to the first sub-transistor T3-1, a second electrode electrically connected to the second node N2, and a gate electrode electrically connected to the j-th third scan line GCLj. The second electrode of the second sub-transistor T3-2 may correspond to the second electrode of the third transistor T3.

The third transistor T3 may include a double gate electrode corresponding to the gate electrodes of the first and second sub-transistors T3-1 and T3-2. Since the third transistor T3 includes the double gate electrode, the leakage current of the pixel PXij may be reduced. However, the embodiment of the inventive concept is not limited thereto, and the third transistor T3 may include a single gate electrode.

The fourth transistor T4 may be electrically connected between the first node N1 and the third voltage line VL3. The fourth transistor T4 may include the first electrode electrically connected to the first node N1, the second electrode electrically connected to the third voltage line VL3 to which the initialization voltage VINT is transmitted, and the gate electrode electrically connected to the j-th first scan line GILj.

The fourth transistor T4 may be turned on according to the first scan signal GIj received through the j-th first scan line GILj and transmit the initialization voltage VINT to the gate electrode of the first transistor T1 electrically connected to the first node N1, and may initialize the voltage of the gate electrode of the first transistor T1. In the present embodiment, the fourth transistor T4 may be defined as an initialization transistor.

The fourth transistor T4 may include third and fourth sub-transistors T4-1 and T4-2. The third and fourth sub-transistors T4-1 and T4-2 may be connected in series between the first node N1 and the third voltage line VL3.

The third sub-transistor T4-1 may include a first electrode electrically connected to the first node N1, a second electrode connected to the fourth sub-transistor T4-2, and a gate electrode electrically connected to the j-th first scan line GILj. The first electrode of the third sub-transistor T4-1 may correspond to the first electrode of the fourth transistor T4. The fourth sub-transistor T4-2 may include a first electrode connected to the third sub-transistor T4-1, a second electrode electrically connected to the third voltage line VL3, and a gate electrode electrically connected to the j-th first scan line GILj. The second electrode of the fourth sub-transistor T4-2 may correspond to the second electrode of the fourth transistor T4.

The fourth transistor T4 may include a double gate electrode corresponding to the gate electrodes of the third and fourth sub-transistors T4-1 and T4-2. Since the fourth transistor T4 includes the double gate electrode, the leakage current of the pixel PXij may be reduced. However, the embodiment of the inventive concept is not limited thereto, and the fourth transistor T4 may include a single gate electrode.

The fifth transistor T5 may be electrically connected between the first power line VL1 and the first transistor T1. The fifth transistor T5 may include the first electrode electrically connected to the first voltage line VL1, the second electrode electrically connected to the first electrode of the first transistor T1, and the gate electrode electrically connected to the j-th emission control line EMLj.

The sixth transistor T6 may be electrically connected between the first transistor T1 and the light emitting element ED. The sixth transistor T6 includes the first electrode electrically connected to the second node N2 to which the second electrode of the first transistor T1 is connected, the second electrode electrically connected to the anode AE of the light emitting element ED, and the gate electrode electrically connected to the j-th emission control line EMLj.

The fifth transistor T5 and the sixth transistor T6 may be turned on according to the emission signal EMj transmitted through the j-th emission control line EMLj. The emission duration of the light emitting element ED may be controlled by the emission signal EMj. In the present embodiment, the fifth transistor T5 and the sixth transistor T6 may be defined as emission control transistors.

When the fifth transistor T5 and the sixth transistor T6 are turned on, a driving current is generated according to a voltage difference between a gate voltage of the gate electrode of the first transistor T1 and the first driving voltage ELVDD, and the driving current is supplied to the light emitting element ED through the sixth transistor T6, so that the light emitting element ED may emit light.

The seventh transistor T7 may be electrically connected between the fourth voltage line VL4 and the anode AE to which the sixth transistor T6 is connected. The seventh transistor T7 may include the first electrode electrically connected to the fourth voltage line VL4, the second electrode electrically connected to the anode AE to which the second electrode of the sixth transistor T6 is connected, and the gate electrode electrically connected to the j-th fourth scan line GBLj.

The eighth transistor T8 may be electrically connected between the fifth voltage line VL5 and the first transistor T1. The eighth transistor T8 may include the first electrode electrically connected to the fifth voltage line VL5, the second electrode electrically connected to the first electrode of the first transistor T1, and the gate electrode electrically connected to the j-th fourth scan line GBLj.

The seventh transistor T7 and the eighth transistor T8 may be turned on according to the j-th fourth scan signal GBj transmitted through the j-th fourth scan line GBLj. In the present embodiment, the seventh transistor T7 and the eighth transistor T8 may be defined as initialization transistors.

As the seventh transistor T7 is turned on, the second initialization voltage AINT may be provided to the anode AE of the light emitting element ED. The seventh transistor T7 may initialize the anode AE of the light emitting element ED to the second initialization voltage AINT. That is, the seventh transistor T7 may prevent the light emitting element ED from instantaneously emitting light at high luminance due to a voltage remaining in the anode AE at the beginning of the driving of the light emitting element ED.

The second initialization voltage AINT may have a level different from that of the first initialization voltage VINT. For example, the second initialization voltage AINT may have a level lower than that of the first initialization voltage VINT. However, if an optimal initialization voltage for removing a voltage remaining in the light emitting element ED may be provided, the embodiment of the inventive concept is not limited to any one.

As the eighth transistor T8 is turned on, the bias voltage Vbias may be provided to the first electrode of the first transistor T1. The bias voltage Vbias may have a predetermined level. The first transistor T1 may exhibit hysteresis properties in which a driving current caused by a signal applied in a current frame driving period is affected by a signal applied in a previous frame driving period. That is, when a driving frequency is varied, a luminance change due to the hysteresis properties of the first transistor T1 may be visually recognized by a user. However, as the eighth transistor T8 provides the bias voltage Vbias to the first electrode of the first transistor T1, the luminance change due to the hysteresis properties may be minimized, and the display quality of the display panel DP (see FIG. 1) may be improved.

The circuit unit PXC may include a first capacitor Cst, and may further include a second capacitor Cse. Each of the first capacitor Cst and the second capacitor Cse may include a first electrode and a second electrode overlapping each other in a plan view.

The first capacitor Cst may include a first electrode electrically connected to the first voltage line VL1 which transmits the first driving voltage ELVDD and a second electrode electrically connected to the first node N1. In the first capacitor Cst, charges corresponding to a voltage difference between the first electrode and the second electrode may be stored. When the fifth transistor T5 and the sixth transistor T6 are turned on, the amount of current flowing through the first transistor T1 may be determined in accordance with a voltage stored in the first capacitor Cst.

The second capacitor Cse may include a first electrode electrically connected to the first voltage line VL1 and a second electrode electrically connected to the first electrode of the first transistor T1. The second capacitor Cse may supplement the capacitance of the first capacitor Cst. The second capacitor Cse allows a data voltage corresponding to the data signal Di to be sufficiently transmitted to the first transistor T1.

Each of the pixels PX illustrated in FIG. 1 may have the same circuit configuration as that shown in the equivalent circuit diagram of the pixel PXij illustrated in FIG. 2. However, the embodiment of the pixel PXij is not limited to what is illustrated, and the number or connection structure of transistors and capacitors included in the pixel unit PXC may be variously changed.

Figure 3:
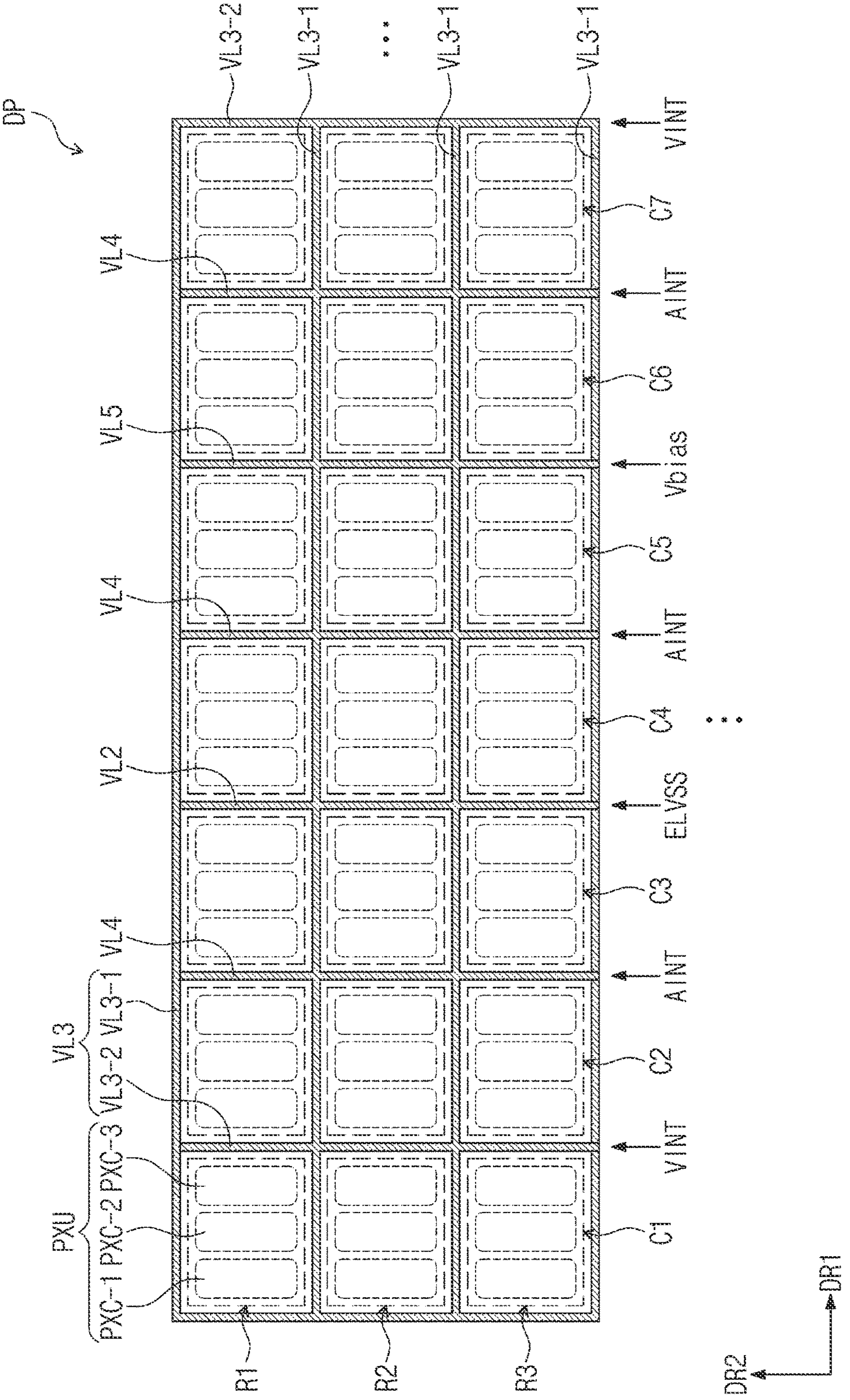
FIG. 3 is a plan view of a display panel according to an embodiment of the inventive concept.

FIG. 3 is a plan view of the display panel DP according to an embodiment of the inventive concept. For convenience of description, FIG. 3 schematically illustrates some components among components of the display panel DP.

Referring to FIG. 3, the pixel unit PXU may include first to third pixels distinguished from each other according to the color of light emitted therefrom, and each of the first to third pixels may include first to third circuit units PXC-1, PXC-2, and PXC-3. In an embodiment, each of the first to third circuit units PXC-1, PXC-2, and PXC-3 may correspond to the circuit unit PXC illustrated in FIG. 2. The first to third pixel units PXC-1, PXC-2, and PXC-3 may be arranged along the first direction DR1 in the pixel unit PXU. However, the arrangement of the first to third pixel units PXC-1, PXC-2, and PXC-3 in the pixel unit PXU may be variously changed without being limited thereto.

The pixel units PXU may be arranged along the first direction DR1 and the second direction DR2 in a plan view. Among the pixel units PXU, pixel units PXU arranged in the first direction DR1 may be grouped and defined as a pixel row. FIG. 3 exemplarily illustrates three pixel rows R1, R2, and R3 arranged along the second direction DR2. Among the pixel units PXU, pixel units PXU arranged in the second direction DR2 may be grouped and defined as a pixel column. FIG. 3 exemplarily illustrates seven pixel columns C1, C2, C3, C4, C5, C6, and C7 arranged along the first direction DR1. The number of pixel rows and the number of pixel columns arranged in the display panel DP are not limited to the illustrated embodiments, and may be variously designed according to the resolution of the display panel DP.

The third voltage line VL3 (or a first initialization voltage line) to which the first initialization voltage VINT is applied may include first initialization voltage line portions VL3-1 and second initialization voltage line portions VL3-2 electrically connected to each other. The second initialization voltage line portions VL3-2 and the first initialization voltage line portions VL3-1 may be disposed on different layers and electrically connected through contact holes. The first initialization voltage VINT may be applied to the first initialization voltage line portions VL3-1 and the second initialization voltage line portions VL3-2 which are electrically connected to each other.

Each of the first initialization voltage line portions VL3-1 may extend in the first direction DR1, and the first initialization voltage line portions VL3-1 may be arranged along the second direction DR2. The first initialization voltage line portions VL3-1 may each be electrically connected to the pixel rows R1, R2, and R3 arranged along the second direction DR2. Pixel units PXU arranged along the first direction DR1 in one pixel row may be electrically connected to the first initialization voltage line unit portion VL3-1 extending in the first direction DR1.

The second initialization voltage line portions VL3-2 may each extend in a direction intersecting the first initialization voltage line portions VL3-1. For example, the second initialization voltage line portions VL3-2 may each extend along the second direction DR2. The second initialization voltage line portions VL3-2 may be arranged along the first direction DR1. r number of pixel columns may be arranged between the second initialization voltage line portions VL3-2. Here, the r is a natural number of 1 or greater. FIG. 3 exemplarily illustrates an embodiment in which the r corresponds to 6. For example, as illustrated in FIG. 3, six pixel columns C2 to C7 may be disposed between the second initialization voltage line portions VL3-2 adjacent to each other in the first direction DR1. By not disposing the second initialization voltage line portions VL3-2 in each pixel column, it is possible to reduce an area for disposing the second initialization voltage line portions VL3-2 within a limited area of the display panel DP. However, the embodiment of the inventive concept is not necessarily limited thereto.

The first initialization voltage line VL3 may have a mesh shape including the first initialization voltage line portions VL3-1 and the second initialization voltage line portions VL3-2 electrically connected to each other while intersecting each other in a plan view. Accordingly, the first initialization voltage line VL3 may be electrically connected to the pixel units PXU arranged along the first direction DR1 and the second direction DR2 and apply the first initialization voltage VINT.

The second voltage line VL2 (or a second driving voltage line) to which the second driving voltage ELVSS is applied, the fourth voltage line VL4 (or a second initialization voltage line) to which the second initialization voltage AINT is applied, and the fifth voltage line VL5 to which the bias voltage Vbias is applied may each extend along the second direction DR2. The second initialization voltage line portion VL3-2, the second initialization voltage line VL4, the second driving voltage line VL2, and the fifth voltage line VL5 may be arranged along the first direction DR1.

The second initialization voltage line portion VL3-2, the second initialization voltage line VL4, the second driving voltage line VL2, and the fifth voltage line VL5 may each be provided in plurality and arranged according to a predetermined rule along the first direction DR1. For example, the second initialization voltage lines VL4 may be disposed in every two pixel columns and be electrically connected to the pixel units PXU, and the second driving voltage line VL2 and the fifth voltage line VL5 may be disposed in every six pixel columns and be electrically connected to the pixel units PXU. However, the rule in which the second initialization voltage line VL4, the second driving voltage line VL2, and the fifth voltage line VL5 are arranged is not limited to the illustrated embodiment, and may be changed according to the design of the display panel DP.

Figure 4:
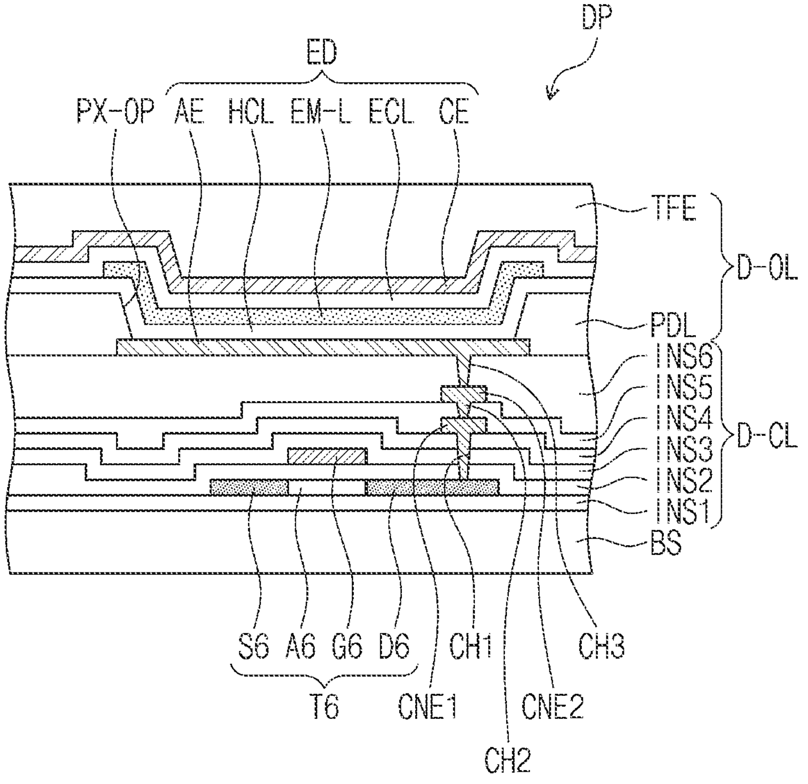
FIG. 4 is a cross-sectional view of a display panel according to an embodiment of the inventive concept.

FIG. 4 is a cross-sectional view of the display panel DP according to an embodiment of the inventive concept.

Referring to FIG. 4, the display panel DP may include a base substrate BS, a circuit element layer D-CL, and a display element layer D-OL. Each of the pixels PX (see FIG.

1) of the display panel DP may include transistors disposed in the circuit element layer D-CL and a light emitting element ED disposed in the display element layer D-OL and be connected to the transistors. FIG. 4 exemplarily illustrates cross-section of the sixth transistor T6 among the transistors constituting the pixels PX (see FIG. 1) and the cross-section of the light emitting element ED.

The base substrate BS may provide a base surface on which the circuit element layer D-CL is disposed. The base substrate BS may include a glass substrate, a metal substrate, a polymer substrate, or an organic/inorganic composite material substrate. The base substrate BS may have a single-layered or multi-layered structure. For example, the base substrate BS of a multi-layered structure may include synthetic resin layers coupled through an adhesive.

The circuit element layer D-CL may be disposed on the base substrate BS. The circuit element layer D-CL may include a semiconductor pattern layer, conductive pattern layers, and insulation layers INS1 to INS6 constituting the circuit unit PXC (see FIG. 2) of a pixel.

Through coating or deposition, an insulation layer, a semiconductor layer, and a conductive layer are formed on the base substrate BS, and then the insulation layer, the semiconductor layer, and the conductive layer may be patterned through photolithography to form a semiconductor pattern layer, conductive patterns, and insulation layers. However, the cross-sectional structure of the circuit element layer D-CL illustrated in FIG. 4 is only exemplary, and the cross-sectional structure of the circuit element layer D-CL may vary depending on a manufacturing process or configuration.

A first insulation layer INS1 may be disposed on the base substrate BS. The first insulation layer INS1 may be provided as a barrier layer and/or a buffer layer including at least one inorganic layer. For example, the first insulation layer INS1 may include at least one of an aluminum oxide, a titanium oxide, a silicon oxide, a silicon nitride, a silicon oxynitride, a zirconium oxide, or a hafnium oxide. The first insulation layer INS1 may improve coupling force between the base substrate BS and the semiconductor pattern layer or between the base substrate BS and the conductive pattern layers, and may protect the semiconductor pattern layer.

The second to sixth insulation layers INS2 to INS6 may be sequentially disposed on the first insulation layer INS1. Each of the second to sixth insulation layers INS2 to INS6 may include an inorganic layer or an organic layer.

The semiconductor pattern layer may be disposed on the first insulation layer INS1. The semiconductor pattern layer may include polysilicon, amorphous silicon, or a metal oxide. The semiconductor pattern layer may include semiconductor patterns of transistors. FIG. 4 exemplarily illustrates a semiconductor pattern of the sixth transistor T6.

The semiconductor pattern layer may include a plurality of regions having different electrical properties depending on whether or not the semiconductor pattern layer is doped. The semiconductor pattern layer may include a first region having a high conductivity and a second region having a low conductivity. The first region may be doped with an N-type dopant or a P-type dopant. A P-type transistor may include a doped region which is doped with the P-type dopant, and an N-type transistor may include a doped region which is doped with the N-type dopant. The second region may be a non-doped region. The conductivity of the first region may be greater than that of the second region, and the first region may substantially correspond to an electrode (or a source region and a drain region) or a signal line of a transistor. The second region may substantially correspond to an active region (or a channel region) of a transistor.

Referring to FIG. 4, the semiconductor pattern of the sixth transistor T6 may include a sixth source region S6, a sixth drain region D6, and a sixth active region A6. The sixth source region S6 and the sixth drain region D6 may be spaced apart from each other with the sixth active region A6 interposed therebetween in a plan view. The sixth source region S6 and the sixth drain region D6 may respectively extend in directions different from each other with respect to the sixth active region A6.

The second insulation layer INS2 may be disposed on the first insulation layer INS1 and cover the semiconductor pattern layer. A sixth gate electrode G6 may be disposed on the second insulation layer INS2. The sixth gate electrode G6 may overlap the sixth active region A6 in a plan view. In an embodiment, the sixth gate electrode G6 may serve as a self-aligned mask in a process of doping the semiconductor pattern of the sixth transistor T6.

The third insulation layer INS3 may be disposed on the second insulation layer INS2 and cover the sixth gate electrode G6. The fourth insulation layer INS4 may be disposed on the third insulation layer INS3.

The circuit element layer D-CL may include connection electrodes CNE1 and CNE2 electrically connecting the sixth transistor T6 and the light emitting element ED. The connection electrodes CNE1 and CNE2 may include a first connection electrode CNE1 and a second connection electrode CNE2.

The first connection electrode CNE1 may be disposed on the fourth insulation layer INS4. The first connection electrode CNE1 may be electrically connected to the sixth transistor T6 through a contact hole CH1 formed through the second to fourth insulation layers INS2 to INS4. The fifth insulation layer INS5 may be disposed on the fourth insulation layer INS4 and cover the first connection electrode CNE1.

The second connection electrode CNE2 may be disposed on the fifth insulation layer INS5. The second connection electrode CNE2 may be electrically connected to the first connection electrode CNE1 through a contact hole CH2 formed through the fifth insulation layer INS5. However, the embodiment of the inventive concept is not limited thereto, and the number of the connection electrodes CNE1 and CNE2 electrically connected between the sixth transistor T6 and the light emitting element ED may be smaller or larger.

The sixth insulation layer INS6 may be disposed on the fifth insulation layer INS5 and cover the second connection electrode CNE2. In an embodiment, the sixth insulation layer INS6 may include at least one organic layer, and the sixth insulation layer INS6 may provide a flat upper surface while covering uneven upper surfaces of components disposed in a lower portion of the sixth insulation layer INS6.

The display element layer D-OL may be disposed on the circuit element layer D-CL. The display element layer D-OL may include the light emitting element ED, a pixel definition film PDL, and an encapsulation layer TFE. The light emitting element ED may include the anode AE, the cathode CE, a hole control layer HCL, an electron control layer ECL, and a light emitting layer EM-L.

The anode AE of the light emitting element ED may be disposed on the sixth insulation layer INS6. The anode AE may be connected to the second connection electrode CNE2 through a contact hole CH3 formed through the sixth insulation layer INS6. That is, the anode AE of the light emitting element ED may be electrically connected to the sixth drain region D6 of the sixth transistor T6 through the connection electrodes CNE1 and CNE2.

The pixel definition film PDL may be disposed on the anode AE. A light emitting opening PX-OP which exposes at least a portion of the anode AE may be defined in the pixel definition film PDL. In the present embodiment, the portion of the anode AE exposed by the light emitting opening PX-OP may correspond to a light emitting region.

The pixel definition film PDL may include a polymer resin, and may further include an inorganic matter included in the polymer resin. The pixel definition film PDL of an embodiment may have a predetermined color. For example, the pixel definition film PDL may include a base resin, and a black pigment and/or a black dye mixed with the base resin. However, the embodiment of the pixel definition film PDL is not limited thereto.

The hole control layer HCL may be disposed on the anode AE and the pixel definition film PDL. The hole control layer HCL may be commonly disposed in the pixels PX (see FIG. 1). The hole control layer HCL may include at least one of a hole injection layer, a hole transport layer, or an electron blocking layer.

The light emitting layer EM-L may be disposed on the hole control layer HCL. The light emitting layer EM-L may be disposed in a region corresponding to the light emitting opening PX-OP. The light emitting layer EM-L may include an organic material and/or an inorganic material. The light emitting layer EM-L may generate light having any one color among red, green, and blue colors.

The electron control layer ECL may be disposed on the light emitting layer EM-L and the hole control layer HCL. The electron control layer ECL may be commonly disposed in the pixels PX (see FIG. 1). The electron control layer ECL may include at least one of an electron injection layer, an electron transport layer, or a hole blocking layer.

The cathode CE may be disposed on the electron control layer ECL. The cathode CE may be commonly disposed in the pixels PX (see FIG. 1).

The first driving voltage ELVDD (see FIG. 2) may be applied to the anode AE, and the second driving voltage ELVSS (see FIG. 2) may be applied to the cathode CE. A hole and an electron injected into the light emitting layer EM-L are combined to form an exciton, and when the exciton transits to a ground state, the light emitting element ED may emit light.

The encapsulation layer TFE may be disposed on the light emitting element ED and seal the light emitting element ED. The encapsulation layer TFE may include a plurality of thin films. For example, the encapsulation layer TFE may include inorganic films and an organic film disposed between the inorganic films. The thin films of the encapsulation layer TFE may be disposed to improve the optical efficiency of the light emitting element ED, or to protect the light emitting element ED. The inorganic film of the encapsulation layer TFE may protect the light emitting element ED from moisture and/or oxygen, and the organic film of the encapsulation layer TFE may protect the light emitting element ED from foreign substances such as dust particles.

FIG. 5A to FIG. 5E are plan views illustrating, in a stepwise manner, the planar structure of the pixel unit PXU according to an embodiment of the inventive concept. FIG. 5A to FIG. 5E illustrate a sequential stacked structure of some patterns constituting the pixel PXij (see FIG. 2).

Figure 5A:
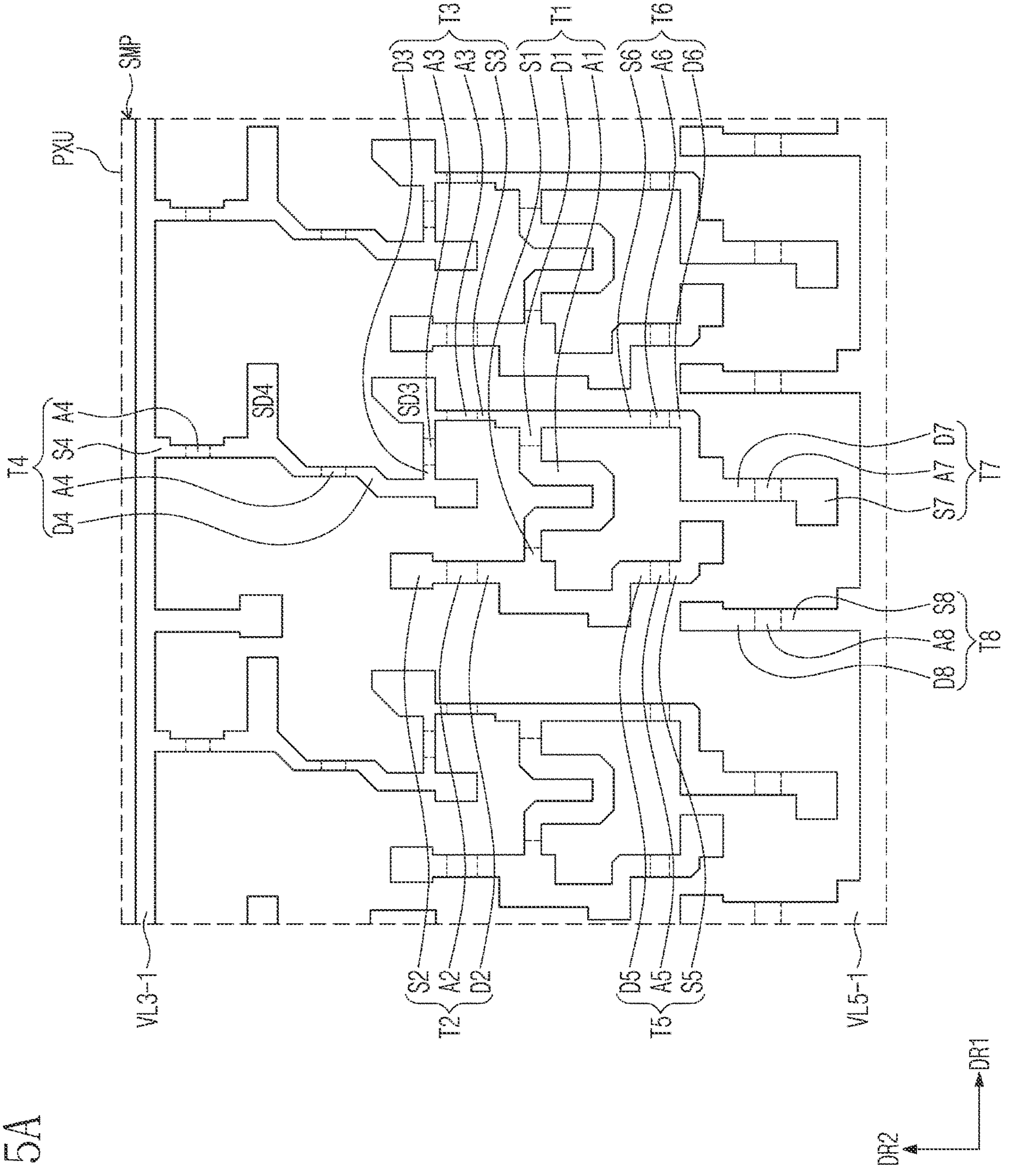
FIG. 5A, 5B, 5C, 5D and FIG. 5E are plan views illustrating, in a stepwise manner, the planar structure of a pixel unit according to an embodiment of the inventive concept.

Referring to FIG. 5A, a semiconductor pattern layer SMP may be disposed on the base substrate BS (see FIG. 4). The semiconductor pattern layer SMP may include semiconductor patterns of the first to eighth transistors T1 to T8. From the semiconductor pattern layer SMP, first to eighth source regions S1 to S8, first to eighth drain regions D1 to D8, and first to eighth active regions A1 to A8 of the first to eighth transistors T1 to T8 may be formed through a doping process using the gate electrodes as a self-aligned masks. The semiconductor patterns of the first to eighth transistors T1 to T8 may be disposed on the same layer.

The first source region S1 and the first drain region D1 of the first transistor T1 may be spaced apart from each other with the first active region A1 interposed therebetween. The first drain region D1 of the first transistor T1 may be connected to the third source region S3 of the third transistor T3 and the sixth source region S6 of the sixth transistor T6. A point to which the first drain region D1, the third source region S3, and the sixth source region S6 are connected may correspond to the second node N2 (see FIG. 2). The first source region S1 of the first transistor T1 may be connected to the second drain region D2 of the second transistor T2 and the fifth drain region D5 of the fifth transistor T5.

The second source region S2 and the second drain region D2 of the second transistor T2 may each extend from the second active region A2, and the second source region S2 and the second drain region D2 may be spaced apart from each other with the second active region A2 interposed therebetween. The fifth source region S5 and the fifth drain region D5 of the fifth transistor T5 may each extend from the fifth active region A5, and the fifth source region S5 and the fifth drain region D5 may be spaced apart from each other with the fifth active region A5 interposed therebetween.

The sixth source region S6 and the sixth drain region D6 of the sixth transistor T6 may each extend from the sixth active region A6, and the sixth source region S6 and the sixth drain region D6 may be spaced apart from each other with the sixth active region A6 interposed therebetween. The seventh source region S7 and the seventh drain region D7 of the seventh transistor T7 may each extend from the seventh active region A7, and the seventh source region S7 and the seventh drain region D7 may be spaced apart from each other with the seventh active region A7 interposed therebetween. The sixth drain region D6 of the sixth transistor T6 may be connected to the seventh drain region D7 of the seventh transistor T7.

The third transistor T3 may include a plurality of third active regions A3. The third active regions A3 of the third transistor T3 may extend from a common conductive region SD3, and be connected through the common conductive region SD3. The third source region S3 and the third drain region D3 of the third transistor T3 may be spaced apart from each other with the common conductive region SD3 and the third active regions A3 interposed therebetween. The third source region S3 of the third transistor T3 may extend from any one third active region A3 and be connected to the first drain region D1 of the first transistor T1. The third drain region D3 of the third transistor T3 may extend from another third active region A3 and be connected to the fourth drain region D4 of the fourth transistor T4. However, the embodiment of the inventive concept is not limited thereto, and the third transistor T3 may include a single third active region A3.

The fourth transistor T4 may include a plurality of fourth active regions A4. The fourth active regions A4 of the fourth transistor T4 may extend from a common conductive region SD4, and be connected through the common conductive region SD4. The fourth source region S4 and the fourth drain region D4 of the fourth transistor T4 may be spaced apart from each other with the common conductive region SD4 and the fourth active regions A4 interposed therebetween.

The fourth source region S4 of the fourth transistor T4 may extend from any one fourth active region A4 and be connected to the first initialization voltage line portion VL3-1. The fourth drain region D4 of the fourth transistor T4 may extend from another fourth active region A4 and be connected to the third drain region D3 of the third transistor T3. However, the embodiment of the inventive concept is not limited thereto, and the fourth transistor T4 may include a single fourth active region A4.

The semiconductor pattern layer SMP may include a first initialization voltage line portion VL3-1 and a 5-1 voltage line portion VL5-1. Each of the first initialization voltage line portion VL3-1 and the 5-1 voltage line portion VL5-1 may extend in the first direction DR1. The first initialization voltage line portion VL3-1 and the 5-1 voltage line portion VL5-1 may be spaced apart from each other and arranged in the second direction DR2.

The first initialization voltage line portion VL3-1 may be connected to the semiconductor patterns of the fourth transistors T4 of the first to third pixel units PXC-1, PXC-2, and PXC-3 (see FIG. 3) of the pixel unit PXU. For example, the first initialization voltage line portion VL3-1 may be connected to the fourth source regions S4 of the fourth transistors T4 of the pixel unit PXU. The first initialization voltage line portion VL3-1 may have a shape of a single body with the semiconductor patterns of the fourth transistors T4 on the same layer. However, the embodiment of the inventive concept is not limited thereto, and the first initialization voltage line portion VL3-1 may be electrically connected to each of the semiconductor patterns of the fourth transistors T4 through a connection electrode. The first initialization voltage VINT (see FIG. 2) may be transmitted to the first initialization voltage line portion VL3-1.

The 5-1 voltage line portion VL5-1 may be connected to the semiconductor patterns of the eighth transistors T8 of the first to third pixel units PXC-1, PXC-2, and PXC-3 (see FIG. 3) of the pixel unit PXU. For example, the 5-1 voltage line portion VL5-1 may be connected to the eighth source regions S8 of the eighth transistors T8 of the pixel unit PXU. The 5-1 voltage line portion VL5-1 may have the shape of a single body with the semiconductor patterns of the eighth transistors T8 on the same layer. However, the embodiment of the inventive concept is not limited thereto, and the 5-1 voltage line portion VL5-1 may be electrically connected to each of the semiconductor patterns of the eighth transistors T8 through a connection electrode. The bias voltage Vbias (see FIG. 2) may be transmitted to the 5-1 voltage line portion VL5-1.

The eighth source region S8 and the eighth drain region D8 of the eighth transistor T8 may extend from the eighth active region A8. The eighth source region S8 and the eighth drain region D8 may be spaced apart from each other with the eighth active region A8 interposed therebetween.

Figure 5B:
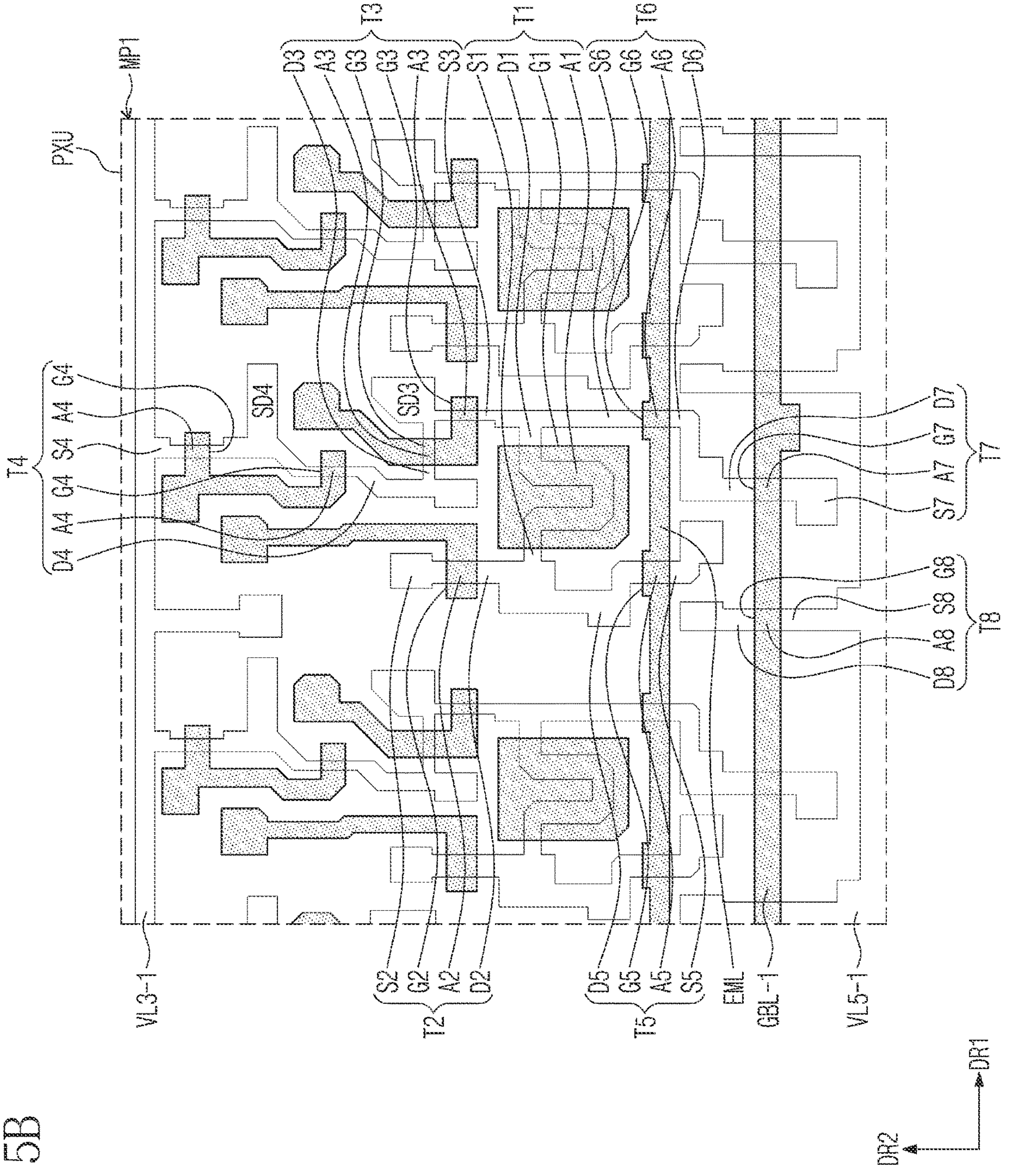

Referring to FIG. 5A and FIG. 5B, a first conductive pattern layer MP1 may be disposed on the semiconductor pattern layer SMP. An insulation layer (e.g., the second insulation layer INS2 of FIG. 4) may be disposed between the semiconductor pattern layer SMP and the first conductive pattern layer MP1 in a thickness direction of the display panel DP (see FIG. 4). The first conductive pattern layer MP1 may include first to eighth gate electrodes G1 to G8 of the first to eighth transistors T1 to T8, an emission control line EML, and a 4-1 scan line portion GBL-1.

The first gate electrode G1 is disposed on the semiconductor pattern of the first transistor T1, and may overlap the first active region A1 in a plan view. The second gate electrode G2 is disposed on the semiconductor pattern of the second transistor T2, and may overlap the second active region A2 in a plan view.

The third transistor T3 may include a double gate electrode. The third gate electrode G3 may overlap the third active regions A3 in a plan view. The third gate electrode G3 may be spaced apart from the common conductive region SD3 of the third transistor T3 in a plan view. However, the embodiment of the inventive concept is not limited thereto, and the third gate electrode G3 may overlap the common conductive region SD3 of the third transistor T3 in a plan view.

The fourth transistor T4 may include a double gate electrode. The fourth gate electrode G4 may overlap the fourth active regions A4 in a plan view. The fourth gate electrode G4 may be spaced apart from the common conductive region SD4 of the fourth transistor T4 in a plan view. However, the embodiment of the inventive concept is not limited thereto, and the fourth gate electrode G4 may overlap the common conductive region SD4 of the fourth transistor T4 in a plan view.

The emission control line EML may extend in the first direction DR1, and overlap the semiconductor patterns of the fifth transistor T5 and the semiconductor patterns of the sixth transistor T6 in a plan view. A portion of the emission control line EML overlapping the fifth active region A5 may be the fifth gate electrode G5 of the fifth transistor T5. Another portion of the emission control line EML overlapping the sixth active region A6 may be the sixth gate electrode G6 of the sixth transistor T6. That is, the fifth gate electrode G5 and the sixth gate electrode G6, and the emission control line EML may have a shape of a single body and be electrically connected to each other. An emission signal may be transmitted to the emission control line EML.

The 4-1 scan line portion GBL-1 may extend in the first direction DR1, and overlap the semiconductor patterns of the seventh transistor T7 and the semiconductor patterns of the eighth transistor T8 in a plan view. A portion of the 4-1 scan line portion GBL-1 overlapping the seventh active region A7 may be the seventh gate electrode G7 of the seventh transistor T7. Another portion of the 4-1 scan line portion GBL-1 overlapping the eighth active region A8 may be the eighth gate electrode G8 of the eighth transistor T8. That is, the seventh gate electrode G7 and the eighth gate electrode G8, and the 4-1 scan line portion GBL-1 may have a shape of a single body and be electrically connected to each other.

Figure 5C:
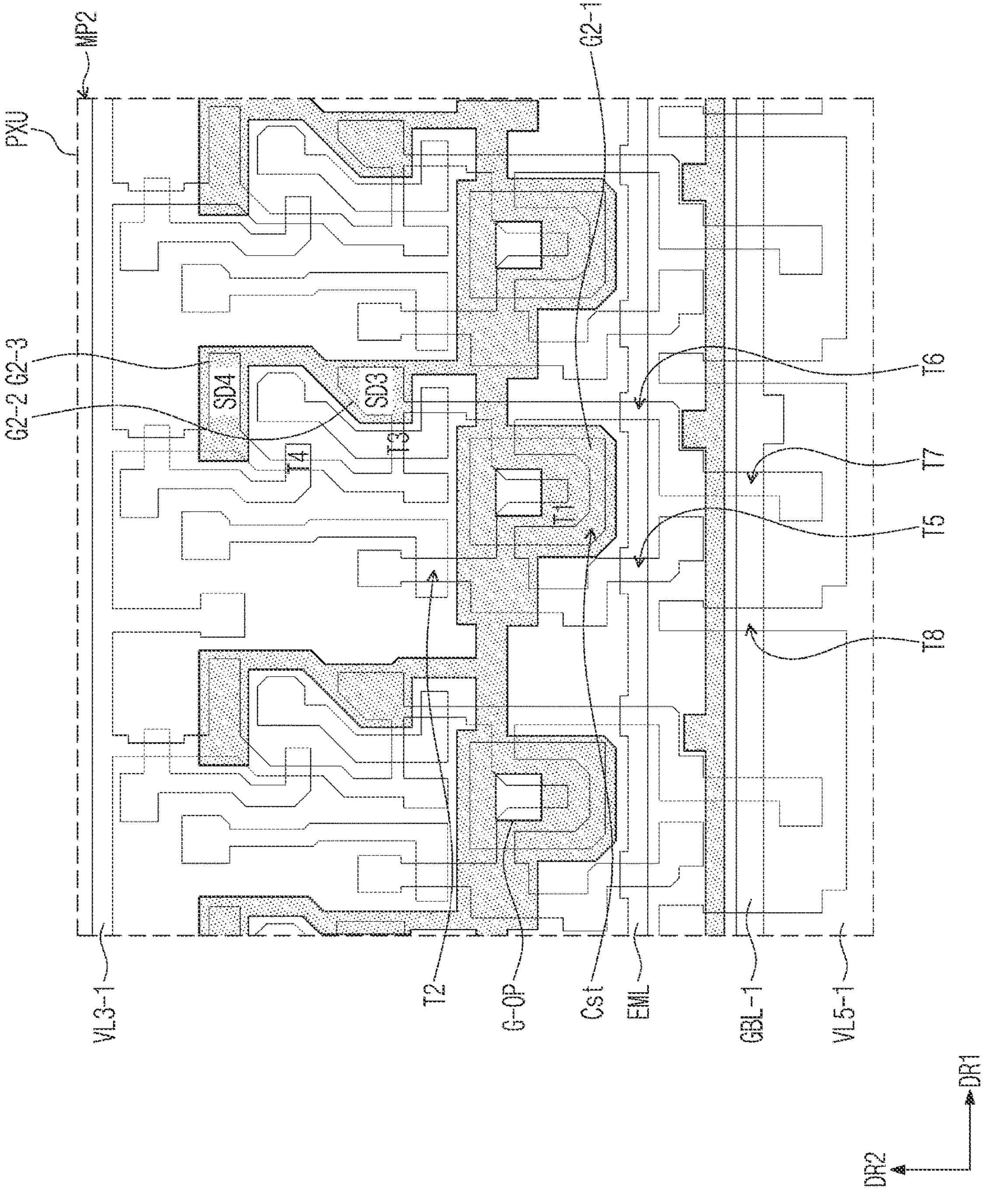
Figure 5D:
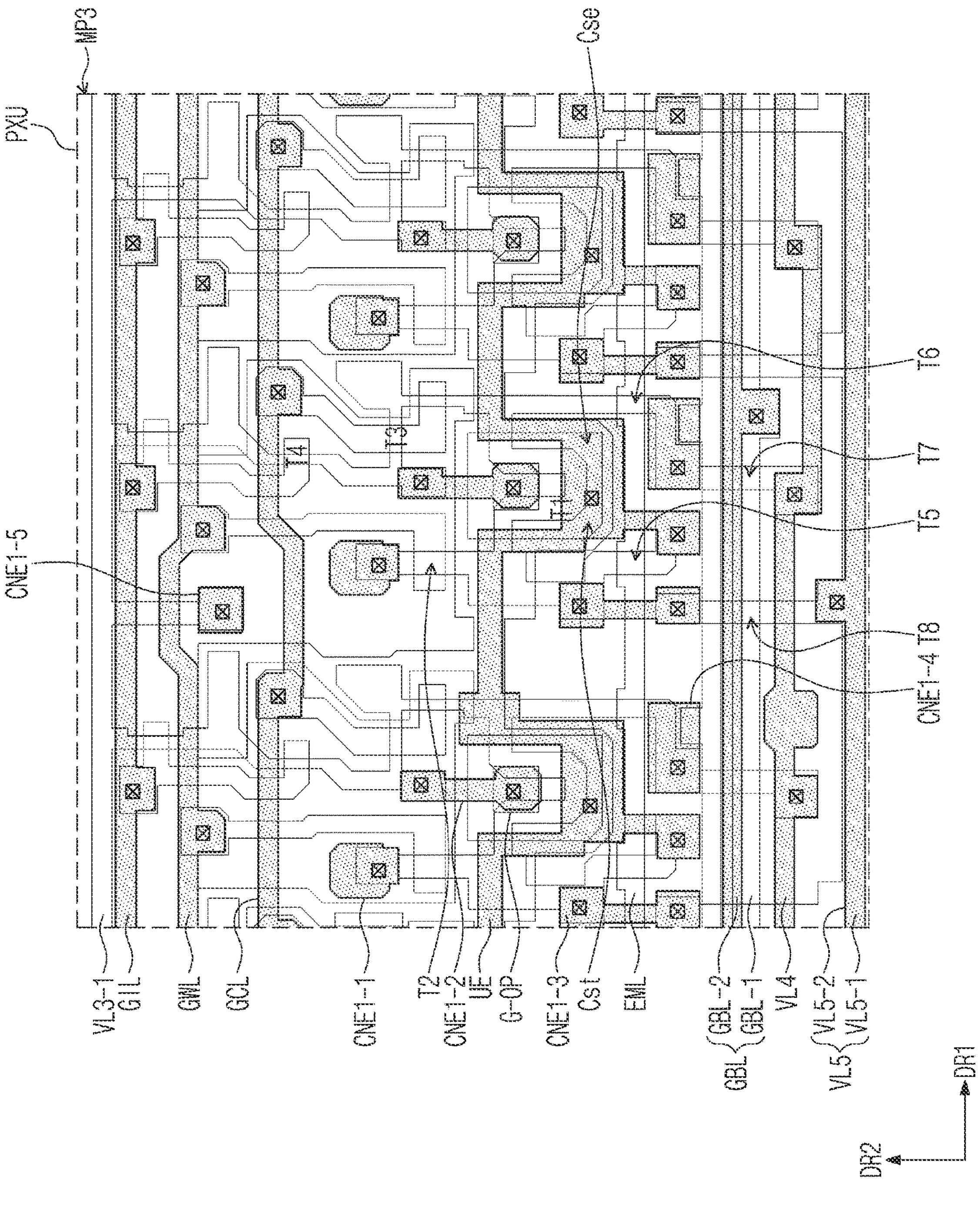
Figure 5E:
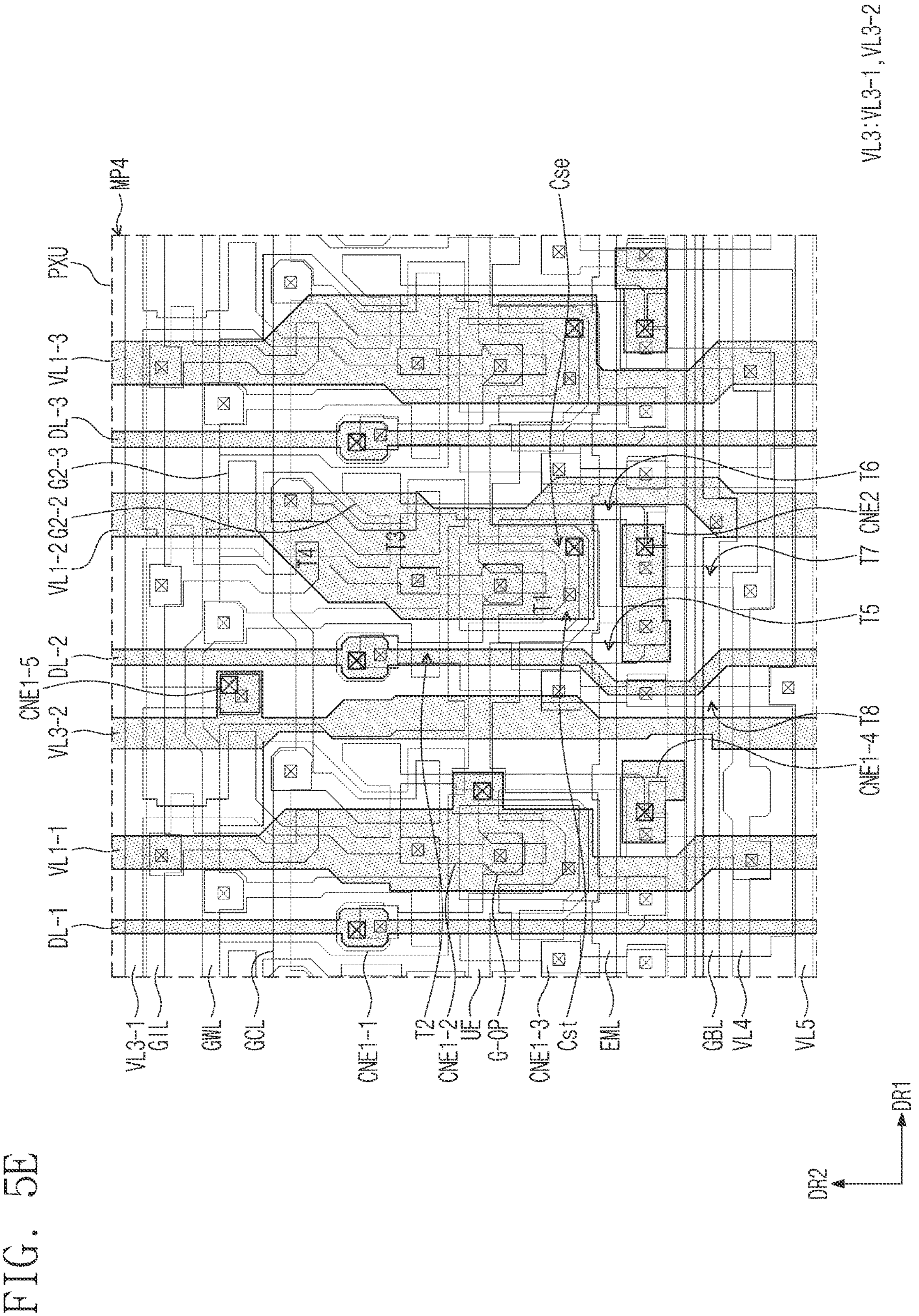

Referring to FIG. 5B and FIG. 5C, a second conductive pattern layer MP2 may be disposed on the first conductive pattern layer MP1. An insulation layer (e.g., the third insulation layer INS3 of FIG. 4) may be disposed between the first conductive pattern layer MP1 and the second conductive pattern layer MP2 in the thickness direction of the display panel DP (see FIG. 4). The second conductive pattern layer MP2 may include first to third conductive pattern portions G2-1, G2-2, and G2-3. The first to third conductive pattern portions G2-1, G2-2, and G2-3 may have a shape of a single body.

The first conductive pattern portion G2-1 may overlap the first gate electrode G1 in a plan view. A portion of the first gate electrode G1 and the first conductive pattern portion G2-1 which overlap each other may form the first capacitor Cst. For example, the first electrode of the first capacitor Cst may correspond to the first conductive pattern portion G2-1 overlapping the first gate electrode G1, and the second electrode of the first capacitor Cst may correspond to the portion of the first gate electrode G1 overlapping the first conductive pattern portion G2-1. In the first conductive pattern portion G2-1, an opening G-OP may be defined. The opening G-OP of the first conductive pattern portion G2-1 may be disposed in an area overlapping the first gate electrode G1.

The second conductive pattern portion G2-2 may overlap the common conductive region SD3 of the third transistor T3 in a plan view. The third conductive pattern portion G2-3 may overlap the common conductive region SD4 of the fourth transistor T4 in a plan view. By overlapping the common conductive regions SD3 and SD4, the second conductive pattern portion G2-2 and the third conductive pattern portion G2-3 prevent the common conductive regions SD3 and SD4 from floating, and thus may prevent an instantaneous voltage rise.

Referring to FIG. 5A to FIG. 5D, a third conductive pattern layer MP3 may be disposed on the second conductive pattern layer MP2. An insulation layer (e.g., the fourth insulation layer INS4 of FIG. 4) may be disposed between the second conductive pattern layer MP2 and the third conductive pattern layer MP3 in the thickness direction of the display panel DP (see FIG. 4). The third conductive pattern layer MP3 may include first connection electrodes CNE1-1, CNE1-2, CNE1-3, CNE1-4, and CNE1-5, an upper electrode UE, a 4-2 scan line portion GBL-2, a 5-2 voltage line portion VL5-2, a first scan line GIL, a second scan line GWL, a third scan line GCL, and a fourth voltage line VL4.

The first connection electrodes CNE1-1, CNE1-2, CNE1-3, CNE1-4, and CNE1-5 may be disposed spaced apart from each other on the same layer. The first connection electrodes CNE1-1, CNE1-2, CNE1-3, CNE1-4, and CNE1-5 may include a 1-1 connection electrode CNE1-1, a 1-2 connection electrode CNE1-2, a 1-3 connection electrode CNE1-3, a 1-4 connection electrode CNE1-4, and a 1-5 connection electrode CNE1-5.

The 1-1 connection electrode CNE1-1 may overlap the second transistor T2 in a plan view. The 1-1 connection electrode CNE1-1 may be electrically connected to the second source region S2 of the second transistor T2 through a contact hole.

The 1-2 connection electrode CNE1-2 may overlap the third drain region D3 of the third transistor T3 and the first gate electrode G1 of the first transistor T1 in a plan view, and may be electrically connected to each of the third drain region D3 and the first gate electrode G1 through contact holes. That is, the third drain region D3 and the first gate electrode G1 may be electrically connected to each other through the 1-2 connection electrode CNE1-2.

The 1-3 connection electrode CNE1-3 may overlap the fifth drain region D5 of the fifth transistor T5 and the eighth drain region D8 of the eighth transistor T8 in a plan view, and may be electrically connected to each of the fifth drain region D5 and the eighth drain region D8 through contact holes. That is, the fifth drain region D5 and the eighth drain region D8 may be electrically connected to each other through the 1-3 connection electrode CNE1-3.

The 1-4 connection electrode CNE1-4 may overlap the sixth transistor T6 in a plan view. The 1-4 connection electrode CNE1-4 may be electrically connected to the sixth drain region D6 of the sixth transistor T6 through a contact hole. The 1-4 connection electrode CNE1-4 may correspond to the first connection electrode CNE1 of FIG. 4.

The 1-5 connection electrode CNE1-5 may overlap a protruding portion extending from the first initialization voltage line portion VL3-1 on the plane. The 1-5 connection electrode CNE1-5 may be electrically connected to the first initialization voltage line portion VL3-1 through a contact hole.

The upper electrode UE may overlap the second conductive pattern layer MP2 in a plan view. A portion of the upper electrode UE and a portion of the second conductive pattern layer MP2 which overlap each other may form the second capacitor Cse. For example, the first electrode of the second capacitor Cse may correspond to the portion of the upper electrode UE overlapping the second conductive pattern layer MP2, and the second electrode of the second capacitor Cse may correspond to the portion of the second conductive pattern layer MP2 overlapping the upper electrode UE.

The 4-2 scan line portion GBL-2 may extend in the first direction DR1. The 4-2 scan line portion GBL-2 overlaps the 4-1 scan line portion GBL-1 in a plan view, and may be electrically connected to the 4-1 scan line portion GBL-1 through a contact hole. The 4-1 scan line portion GBL-1 and the 4-2 scan line portion GBL-2 which are electrically connected to each other may constitute a fourth scan line GBL. The fourth scan line GBL may be electrically connected to the eighth gate electrode G8 of the eighth transistor T8.

The 5-2 voltage line portion VL5-2 may extend in the first direction DR1. The 5-2 voltage line portion VL5-2 overlaps the 5-1 voltage line portion VL5-1 in a plan view, and may be electrically connected to the 5-1 voltage line portion VL5-1 through a contact hole. The 5-1 voltage line portion VL5-1 and the 5-2 voltage line portion VL5-2 which are electrically connected to each other may constitute the fifth voltage line VL5. The 5-2 voltage line portion VL5-2 may include a material with better conductivity than the 5-1 voltage line portion VL5-1 does, and may improve the resistance of the fifth voltage line VL5. The fifth voltage line VL5 may be electrically connected to the eighth source region S8 of the eighth transistor T8 to transmit the bias voltage Vbias (see FIG. 2).

Each of the first scan line GIL, the second scan line GWL, and the third scan line GCL may extend in the first direction DR1. The first scan line GIL, the second scan line GWL, and the third scan line GCL may be arranged in the second direction DR2. The first scan line GIL may be electrically connected to the fourth gate electrode G4 of the fourth transistor T4 through a contact hole. The second scan line GWL may be electrically connected to the second gate electrode G2 of the second transistor T2 through a contact hole. The third scan line GCL may be electrically connected to the third gate electrode G3 of the third transistor T3 through a contact hole.

The fourth voltage line VL4 may extend in the first direction DR1. The fourth voltage line VL4 may be electrically connected to the seventh source region S7 of the seventh transistor T7 through a contact hole, and transmit the second initialization voltage AINT (see FIG. 2).

Referring to FIG. 5A to FIG. 5E, a fourth conductive pattern layer MP4 may be disposed on the third conductive pattern layer MP3. An insulation layer (e.g., the fifth insulation layer INS5 of FIG. 4) may be disposed between the third conductive pattern layer MP3 and the fourth conductive pattern layer MP4 in the thickness direction of the display panel DP (see FIG. 4). The fourth conductive pattern layer MP4 may include data lines DL-1, DL-2, and DL-3, first voltage lines VL1-1, VL1-2, and VL1-3, the second initialization voltage line portion VL3-2, and the second connection electrode CNE2.

Each of the data lines DL-1, DL-2, and DL-3 may extend in the second direction DR2. The data lines DL-1, DL-2, and DL-3 may be arranged along the first direction DR1. The data lines DL-1, DL-2, and DL-3 may be electrically connected to the second transistors T2 of the first to third pixel units PXC-1, PXC-2, and PXC-3 (see FIG. 3) of the pixel unit PXU, respectively. For example, the data lines DL-1, DL-2, and DL-3 may be electrically connected to the second source region S2 of the corresponding second transistor T2 through the 1-1 connection electrode CNE1-1, respectively, and transmit a data signal.

Each of the first voltage lines VL1-1, VL1-2, and VL1-3 may extend in the second direction DR2. The first voltage lines VL1-1, VL1-2, and VL1-3 may be arranged along the first direction DR1. The first voltage lines VL1-1, VL1-2, and VL1-3 may be electrically connected to the first capacitors Cst and the second capacitors Cse of the first to third pixel units PXC-1, PXC-2, and PXC-3 (see FIG. 3) of the pixel unit PXU, respectively. For example, the first voltage lines VL1-1, VL1-2, and VL1-3 may be electrically connected to the first electrode of the corresponding first capacitor Cst and the first electrode of the corresponding second capacitor Cse, respectively, and transmit the first driving voltage ELVDD (see FIG. 2).

The second initialization voltage line portion VL3-2 may extend in the second direction DR2. The second initialization voltage line portion VL3-2 may be electrically connected to the first initialization voltage line portion VL3-1. For example, the second initialization voltage line portion VL3-2 may be electrically connected to the first initialization voltage line portion VL3-1 through the 1-5 connection electrodes CNE1-5. The second initialization voltage line portion VL3-2 and the first initialization voltage line portion VL3-1 may be disposed on different layers and include different materials. For example, the second initialization voltage line portion VL3-2 may include a material with greater conductivity than the first initialization voltage line portion VL3-1 does. The first initialization voltage line portion VL3-1 and the second initialization voltage line portion VL3-2 which are electrically connected to each other may constitute the first initialization voltage line VL3 (or a third voltage line). The first initialization voltage line VL3 may be electrically connected to the fourth source region S4 of the fourth transistor T4, and transmit the first initialization voltage VINT (see FIG. 2).

The second connection electrode CNE2 may overlap the sixth transistor T6 in a plan view. The second connection electrode CNE2 may be electrically connected to the 1-4 connection electrode CNE1-4 through a contact hole. The second connection electrode CNE2 may be electrically connected to the sixth drain region D6 of the sixth transistor T6 through the 1-4 connection electrodes CNE1-4. The second connection electrode CNE2 may correspond to the second connection electrode CNE2 of FIG. 4.

The shapes of the patterns constituting the pixel unit PXU illustrated in FIG. 5A to FIG. 5E are only exemplary and are not necessarily limited thereto.

Figure 6:
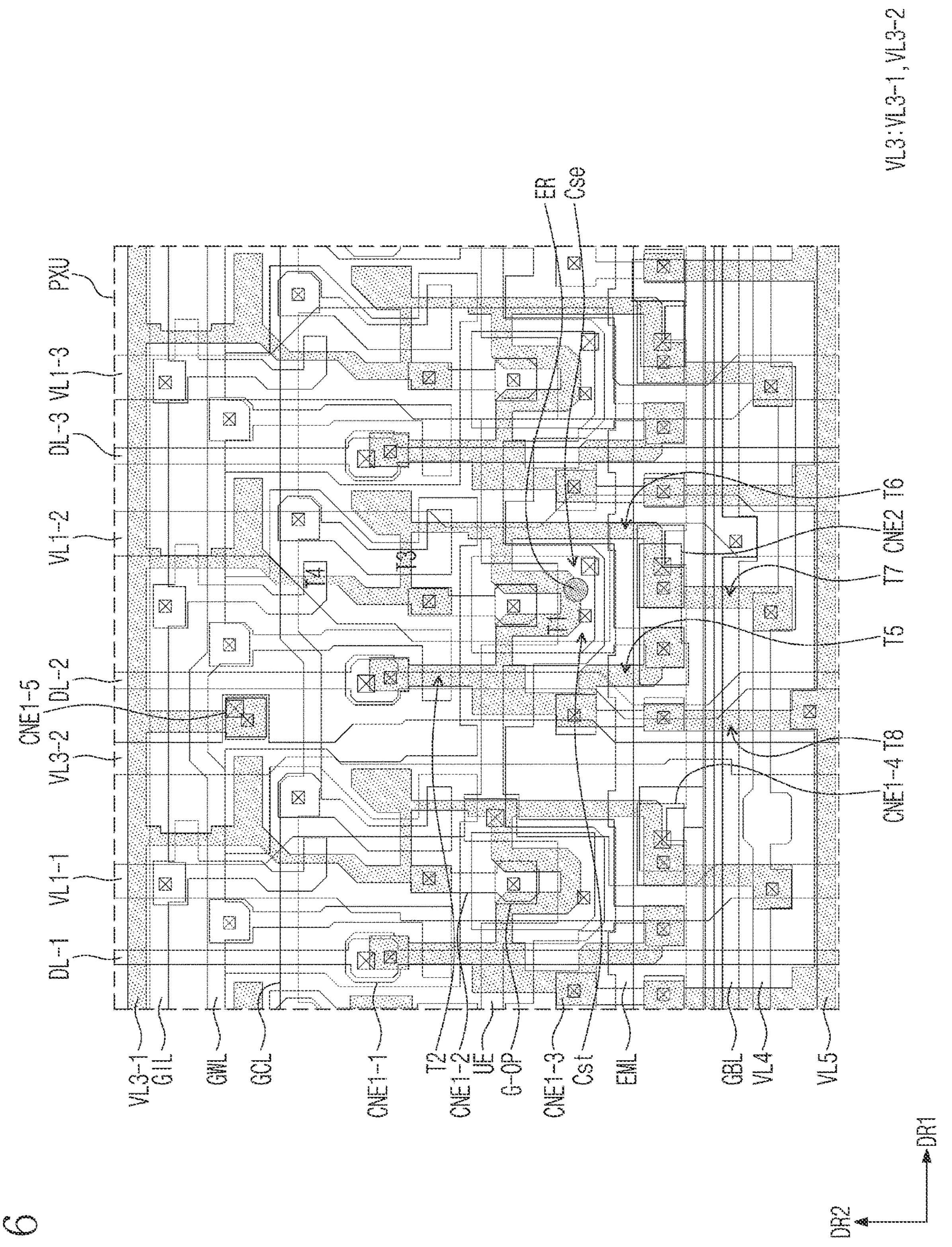
FIG. 6 is a planar structure of a damaged pixel according to an embodiment of the inventive concept.
Figure 7A:
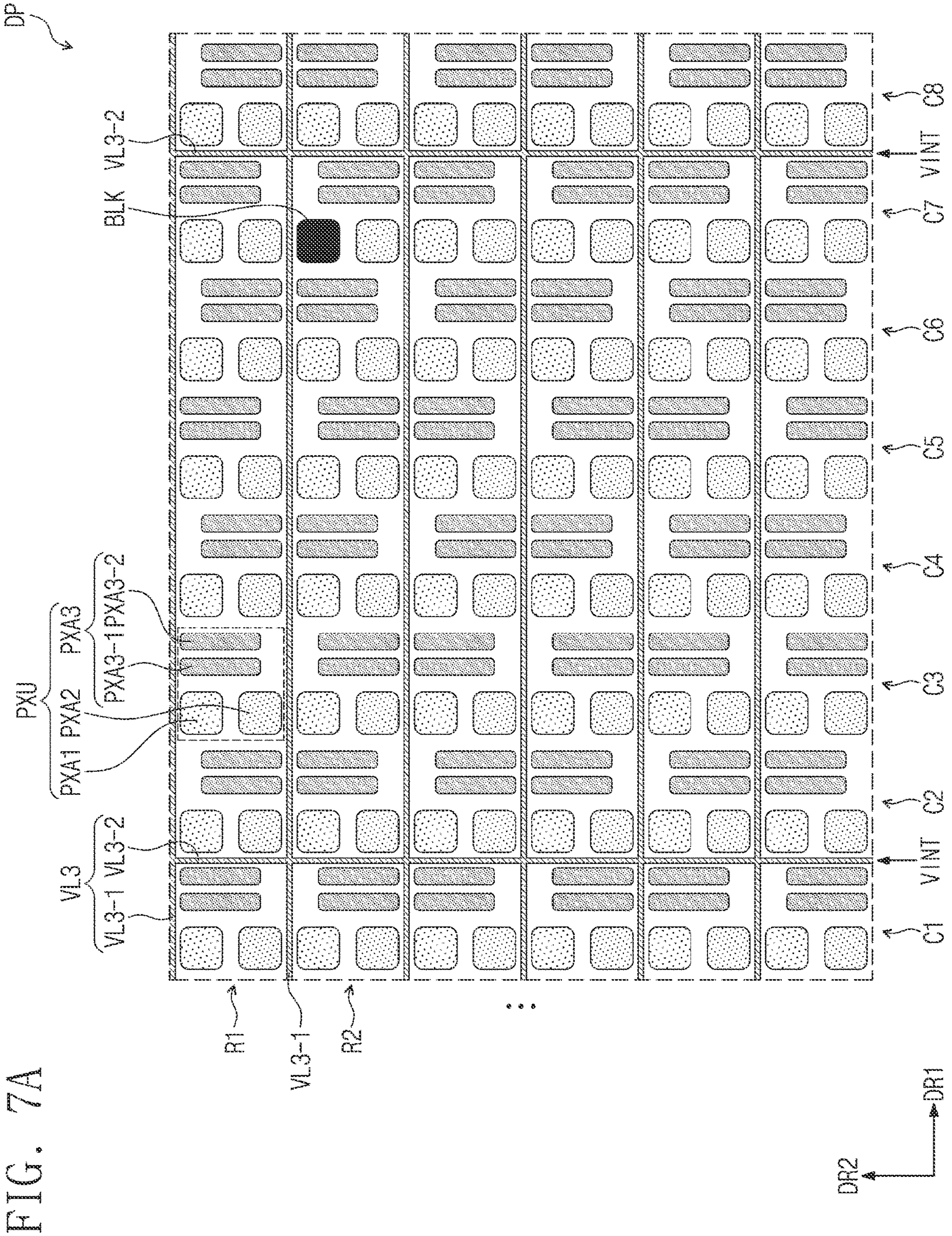
FIG. 7A and FIG. 7B are plan views of a damaged display panel according to an embodiment of the inventive concept.
Figure 7B:
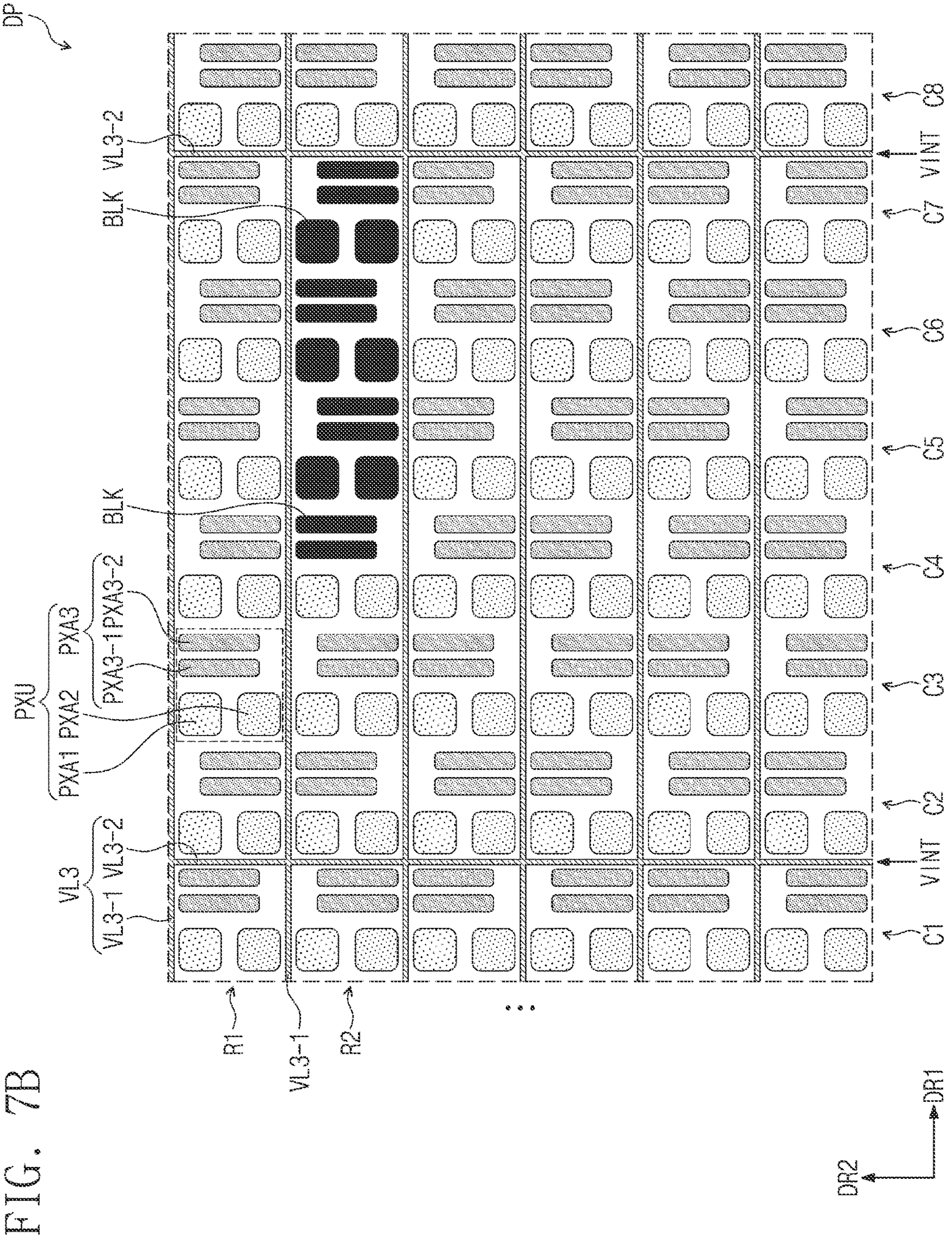

FIG. 6 is a planar structure of a damaged pixel according to an embodiment of the inventive concept. FIG. 7A and FIG. 7B are plan views of a damaged display panel according to an embodiment of the inventive concept.

Referring to FIG. 6, a defect ER may be generated in the first capacitor Cst due to the inflow of foreign substances, a process error in a process of forming a conductive pattern layer, or the like. For example, the first capacitor Cst may be short-circuited. Due to the short-circuit of the first capacitor Cst of any one pixel, a defect may be generated in the one pixel, and an increased first initialization voltage may be applied to pixels adjacent to the one pixel. Accordingly, the pixels adjacent to the pixel which has a defect may be visually recognized to the outside as a dark point.

Referring to FIG. 7A, the first initialization voltage line VL3 may include first initialization voltage line portions VL3-1 and second initialization voltage line portions VL3-2. The above-described descriptions may be applied with respect to the first initialization voltage line portions VL3-1 and the second initialization voltage line portions VL3-2.

The first initialization voltage line portions VL3-1 may extend in the first direction DR1, and arranged along the second direction DR2. The first initialization voltage line portions VL3-1 may be disposed in every pixel rows R1, R2, . . . . Each of the first initialization voltage line portions VL3-1 may be connected to pixels disposed in a corresponding pixel row. The second initialization voltage line portions VL3-2 may extend in the second direction DR2, and arranged along the first direction DR1. The second initialization voltage line portions VL3-2 may be disposed in every r number of pixel columns, and electrically connected to the first initialization voltage line portions VL3-1 to provide the initialization voltage to the pixel units PXU. For example, FIG. 7A exemplarily illustrates that the second initialization voltage line portions VL3-2 are disposed in every six pixel columns. The first initialization voltage line portions VL3-1 extending along a first direction and the second initialization voltage line portions VL3-2 extending along the second direction are electrically connected to each other to form a mesh shape and transmit the first initialization voltage VINT to the pixel units PXU.

Each of the pixel units PXU may include first to third light emitting regions PXA1, PXA2, and PXA3 corresponding to regions in which light emitting elements are disposed. The first to third light emitting regions PXA1, PXA2, and PXA3 may be distinguished from each other according to the color of light emitted therefrom. For example, the first light emitting region PXA1 may emit red light, the second light emitting region PXA2 may emit green light, and the third light emitting region PXA3 may emit blue light. However, the colors of emitted light are not limited to the above examples.

At least two or more light emitting regions among the first to third light emitting regions PXA1, PXA2, and PXA3 may have the same area with each other, or may have different areas with each other without being limited thereto. The areas of the first to third light emitting regions PXA1, PXA2, and PXA3 may be variously designed according to the luminous efficiency of the light emitting region, the resolution of the display panel DP, and the like.

In the pixel unit PXU, the first light emitting region PXA1 and the second light emitting region PXA2 may be arranged in the second direction DR2. In the pixel unit PXU, the third light emitting region PXA3 may be arranged in the first direction DR1 with the first light emitting region PXA1 and the second light emitting region PXA2. In the first direction DR1, each of the first light emitting region PXA1 and the second light emitting region PXA2 may overlap the third light emitting region PXA3. The third light emitting region PXA3 may include sub-third light emitting regions PXA3-1 and PXA3-2 which emit light of substantially the same color. The sub-third light emitting regions PXA3-1 and PXA3-2 may be spaced apart from each other in the first direction DR1.

The first light emitting regions PXA1 of the pixel units PXU arranged in one pixel row R1 or R2 may be arranged side by side along the first direction DR1. The second light emitting regions PXA2 of the pixel units PXU arranged in one pixel row R1 or R2 may be arranged side by side along the first direction DR1. The third light emitting regions PXA3 of the pixel units PXU arranged in one pixel row R1 or R2 may be arranged to be shifted from each other in the first direction DR1. For example, within one pixel row R1 or R2, the third light emitting regions PXA3 may be alternately disposed in upper portions and lower portions along the first direction DR1.

The first light emitting regions PXA1 and the second light emitting regions PXA2 of the pixel units PXU arranged in one pixel column C1, C2, C3, C4, C5, C6, C7, or C8 may be alternatively arranged along the second direction DR2. The third light emitting regions PXA3 of the pixel units PXU arranged in one pixel column C1, C2, C3, C4, C5, C6, C7, or C8 may be arranged while having a symmetrical shape in the second direction DR2.

However, the arrangement, shape, and area of the first to third light emitting regions PXA1, PXA2, and PXA3 illustrated in FIG. 7A are only exemplary, and are not limited to those illustrated.

FIG. 7A exemplarily illustrates a weak dark point BLK generated due to a defect generated in the first light emitting region PXA1 of the pixel unit PXU disposed in the second pixel row R2 and the seventh pixel column C7. The defect (e.g., the generation of the weak dark point BLK) of the first light emitting region PXA1 may be due to the short-circuit of the first capacitor Cst as illustrated in FIG. 6. FIG. 7B exemplarily illustrates a state after a predetermined time has elapsed since the generation of the defect in the first light emitting region PXA1 disposed in the second pixel row R2 and the seventh pixel column C7 of FIG. 7A.

Referring to FIG. 7B, weak dark point BLK defects may be extended in pixel units PXU disposed in the same row as the first light emitting region PXA1 (e.g., the second pixel row R2) which has a defect. The first initialization voltage VINT applied to adjacent pixel units PXU may be increased due to the short-circuit of the first capacitor Cst (see FIG. 6) of the pixel unit PXU which has an initial defect. In particular, a defect such as the weak dark point BLK may be easily generated in a pixel row disposed in the same pixel row, and disposed between adjacent second initialization voltage line portions VL3-2 where the pixel unit PXU having an initial defect is disposed. For example, In pixels disposed in the second pixel rows and disposed in the second to sixth pixel columns C2 to C6, the weak dark point may be easily generated.

Hereinafter, with reference to the drawings, a method for repairing the display panel DP such that a defect is not generated in adjacent pixel units PXU when a defect is generated due to the short-circuit of the first capacitor Cst (see FIG. 6) will be described.

Figure 8A:
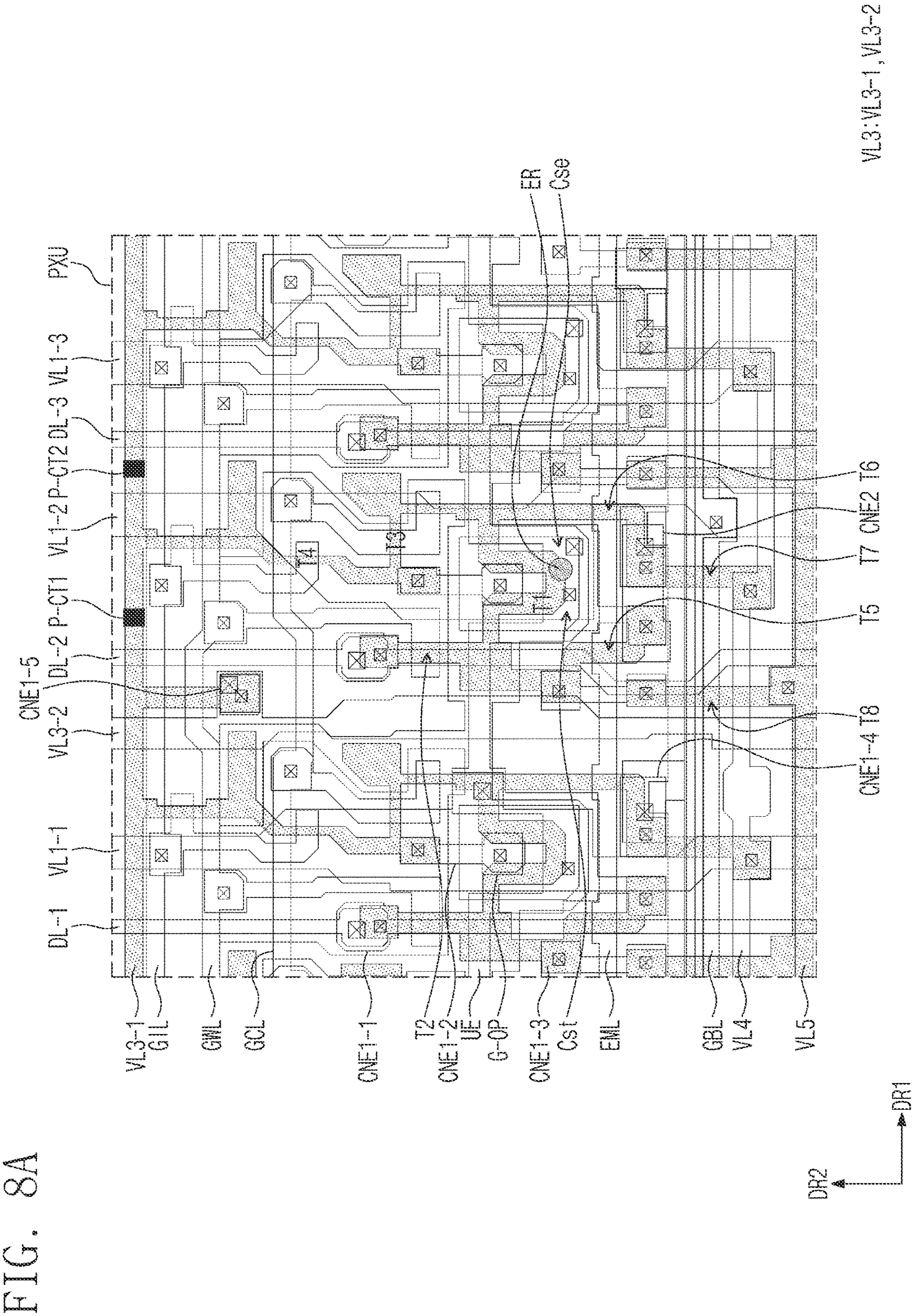
FIG. 8A and FIG. 8B are plan views illustrating one step of a method for repairing a damaged display panel according to an embodiment of the inventive concept.
Figure 8B:
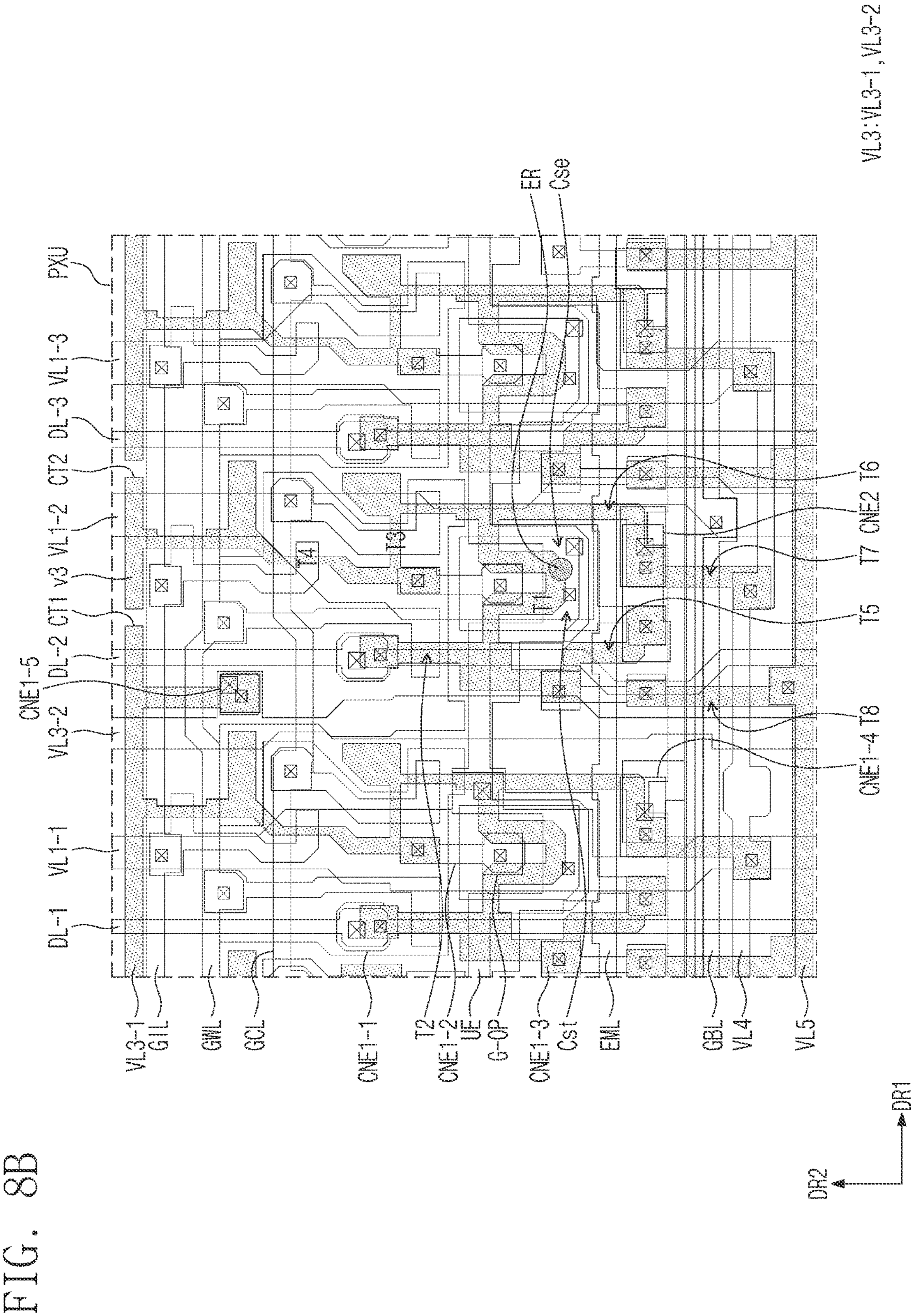
Figure 9A:
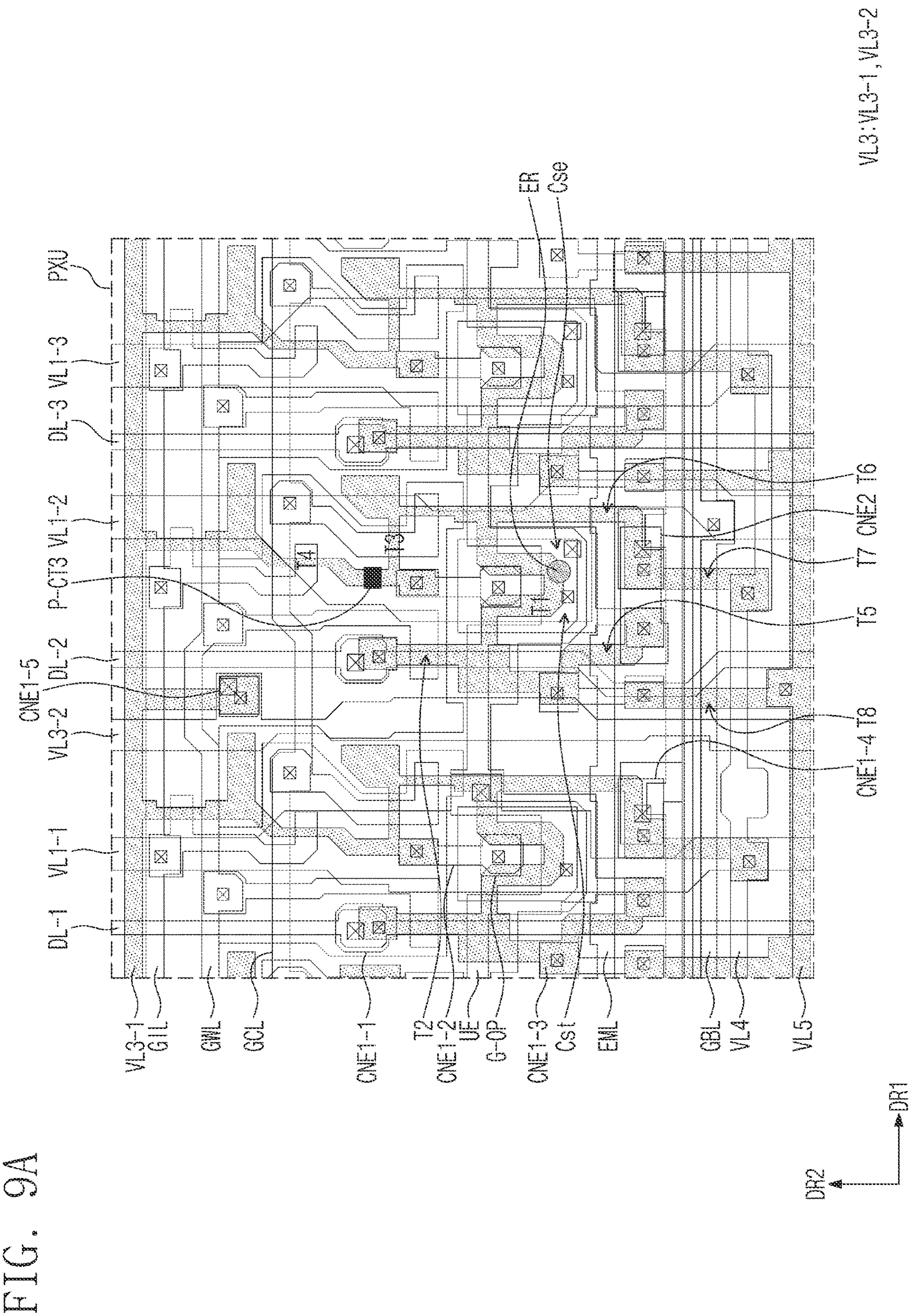
FIG. 9A and FIG. 9B are plan views illustrating one step of a method for repairing a damaged display panel according to an embodiment of the inventive concept.
Figure 9B:
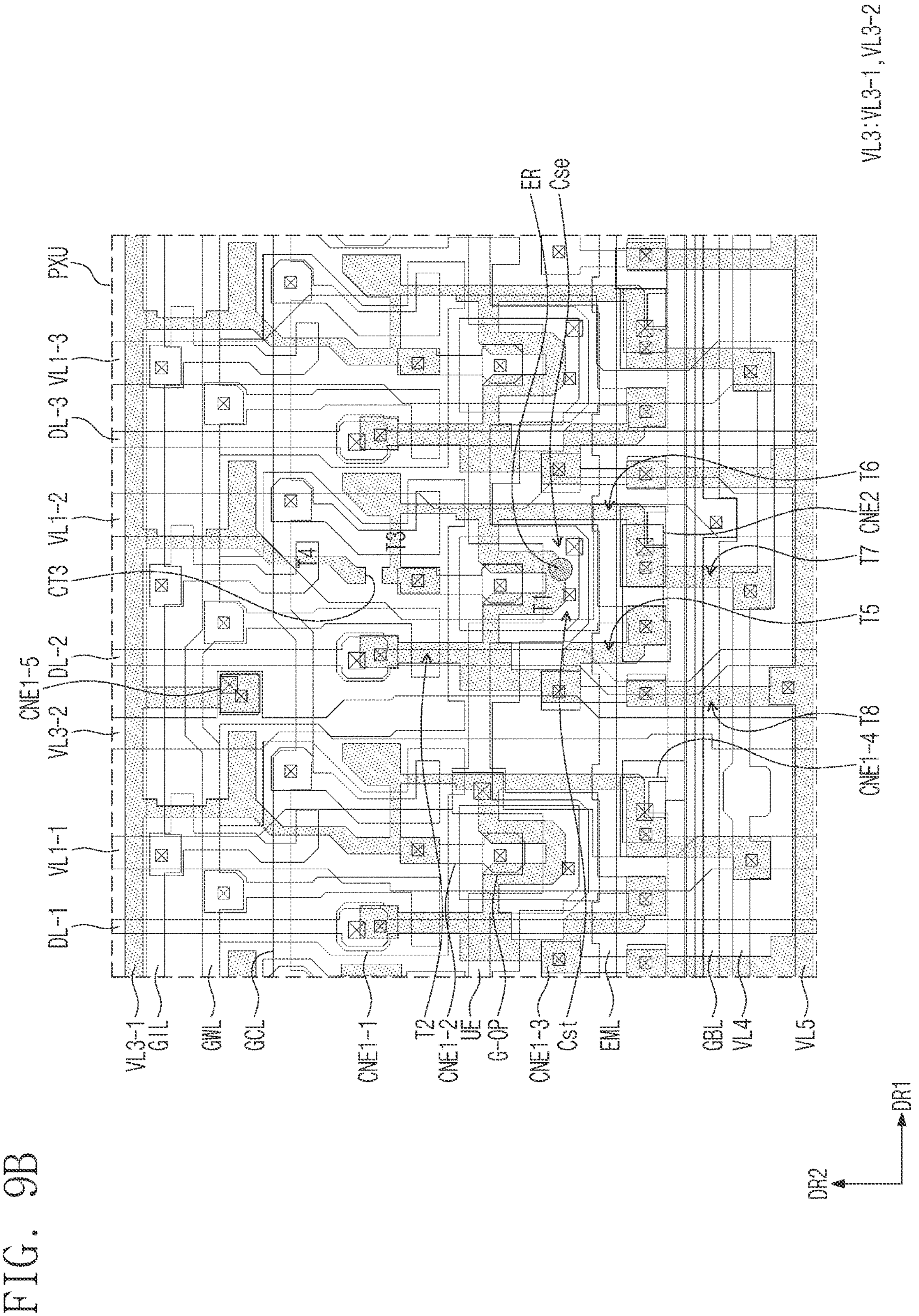

FIG. 8A and FIG. 8B are plan views illustrating one step of a method for repairing a damaged display panel according to an embodiment of the inventive concept. FIG. 9A and FIG. 9B are plan views illustrating one step of a method for repairing a damaged display panel according to an embodiment of the inventive concept.

Referring to FIG. 8A and FIG. 9A, preliminary cut portions P-CT1, P-CT2, and P-CT3 may be set on a path which is electrically connected to the circuit unit of a pixel having a defect (or a defective circuit unit), and which transmits the first initialization voltage VINT (see FIG. 2 and FIG. 3) to the defective circuit unit. Portions which are to be cut among patterns forming the pixel unit PXU may be set as the preliminary cut portions P-CT1, P-CT2, and P-CT3. By blocking the path through which the first initialization voltage VINT (see FIG. 2 and FIG. 3) is transmitted to a defective circuit unit, it is possible to prevent an increased first initialization voltage from being applied to circuit units of pixels adjacent to the defective circuit unit. Through the above, it is possible to prevent the weak dark point BLK (see FIG. 7B) from being expanded in the pixels adjacent to the defective circuit unit, and to prevent the dark point from being visually recognized to the outside. In addition, by repairing a display panel using the repair method of the inventive concept, it is possible to minimize the disposal of defective display panels and to improve the manufacturing yield of the display panel.

Referring to FIG. 8A, the preliminary cut portions P-CT1 and P-CT2 may be set in the first initialization voltage line portion VL3-1 electrically connected to a defective circuit unit including the first capacitor Cst that is short-circuited due to the generation of the defect ER. Specifically, the first initialization voltage line portion VL3-1 may be electrically connected to the fourth transistor T4 of circuit units in the pixel unit PXU, and the preliminary cut portions P-CT1 and P-CT2 may be set in portions of the first initialization voltage line portion VL3-1 connected to the semiconductor pattern of the fourth transistor T4 of the defective circuit unit.

On the path through which the first initialization voltage VINT (see FIG. 2 and FIG. 3) is transmitted to the fourth transistor T4 of the defective circuit unit, the preliminary cut portions P-CT1 and P-CT2 may be set by being spaced apart, and a portion of the first initialization voltage line portion VL3-1 corresponding to a gap between the preliminary cut portions P-CT1 and P-CT2 may be a portion connected to the fourth transistor T4 of the defective circuit unit. That is, the semiconductor pattern of the fourth transistor T4 of the defective circuit unit may extend from the portion of the first initialization voltage line portion VL3-1 disposed between the preliminary cut portions P-CT1 and P-CT2.

Referring to FIG. 8A and FIG. 8B, the portions of the first initialization voltage line portion VL3-1 corresponding to the preliminary cut portions P-CT1 and P-CT2 may be cut to form cut portions CT1 and CT2, for example, by using a laser. The portions of the first initialization voltage line portion VL3-1 may be disconnected from each other by the formation of the cut portions CT1 and CT2. The cut portions CT1 and CT2 may be formed in portions of the first initialization voltage line portion VL3-1 not overlapping the first to fourth conductive pattern layers MP1, MP2, MP3, and MP4 (see FIG. 5B to FIG. 5E) in a plan view. As a result, the portions of the first initialization voltage line portion VL3-1 may be easily cut in a process of repairing a display panel.

By the first capacitor Cst that is short-circuited in the defective circuit unit, an increased initialization voltage may be applied through the first initialization voltage line portion VL3-1 to circuit units adjacent to the defective circuit unit in the first direction DR1. One cut portion CT1 may block the path of the first initialization voltage VINT (see FIG. 2 and FIG. 3) connected between the defective circuit unit and a circuit unit disposed on the left side of the defective circuit unit. The other cut portion CT2 may block the path of the first initialization voltage VINT (see FIG. 2 and FIG. 3) connected between the defective circuit unit and a circuit unit disposed on the right side of the defective circuit unit. By forming the cut portions CT1 and CT2 in the first initialization voltage line portion VL3-1 to block the path of the first initialization voltage VINT (see FIG. 2 and FIG. 3) between the defective circuit unit and adjacent circuits, it is possible to prevent the increased first initialization voltage from being applied to the circuit units adjacent to the defective circuit unit.

A portion v3 formed from the first initialization voltage line portion VL3-1 by the cut portions CT1 and CT 2 may be electrically insulated from the rest of the first initialization voltage line portion VL3-1. A defective circuit unit connected to the portion v3 may be isolated from other pixels, and the defective circuit may be blocked from expanding defects in the other pixels. In addition, even when the cut portions CT1 and CT2 are formed, the remaining pixels other than a defective pixel may be applied with the first initialization voltage VINT (see FIG. 2 and FIG. 3) through the first initialization voltage line portions VL3-1 and the second initialization voltage line portions VL3-2 connected in a mesh form, and may be driven without being affected by the defective pixel.

Referring to FIG. 9A, the preliminary cut portion P-CT3 may be set in a portion of the semiconductor pattern of the fourth transistor T4 corresponding to a path which is electrically connected to a defective circuit unit including the first capacitor Cst short-circuited due to the defect ER and through which the first initialization voltage VINT (see FIG. 2 and FIG. 3) is transmitted. Specifically, the semiconductor pattern of the fourth transistor T4 may extend and be connected from the first initialization voltage line portion VL3-1, and the first initialization voltage line portion VL3-1 and the semiconductor pattern of the fourth transistor T4 may correspond to the path through which the first initialization voltage VINT (see FIG. 2 and FIG. 3) is transmitted in the circuit unit. In an embodiment, the preliminary cut portion P-CT3 may be set between the semiconductor pattern of the fourth transistor T4 of the defective circuit unit and the semiconductor pattern of the third transistor T3.

Referring to FIG. 9A and FIG. 9B, a portion between the semiconductor pattern of the fourth transistor T4 and the semiconductor pattern of the third transistor T3 which corresponds to the preliminary cut portion P-CT3 may be cut to form a cut portion CT3. The third transistor T3 and the fourth transistor T4 may be disconnected by the cut portion CT3. The cut portion CT3 may be formed in a portion of the semiconductor pattern of the fourth transistor T4 not overlapping the first to fourth conductive pattern layers MP1, MP2, MP3, and MP4 (see FIG. 5B to FIG. 5E) in a plan view. As a result, the portion of the semiconductor pattern of the fourth transistor T4 may be easily cut in the process of repairing the display panel.

By the first capacitor Cst that is short-circuited in the defective circuit unit, an increased initialization voltage may be applied through the first initialization voltage line portion VL3-1 to circuit units adjacent to a defective circuit unit in the first direction DR1. The cut portion CT3 may block the application of a first initialization voltage which has been increased due to the short-circuited first capacitor Cst to adjacent circuit units through the fourth transistor T4 and the first initialization voltage line portion VL3-1. That is, the cut portion CT3 may block the connection between the third transistor T3 electrically connected to the first capacitor Cst and the fourth transistor T4 electrically connected to the first initialization voltage line portion VL3-1, and by blocking a path through which the first initialization voltage VINT (see FIG. 3) is transmitted between the defective circuit unit and adjacent circuit units, it is possible to prevent the increased first initialization voltage from being applied to the circuit units adjacent to the defective circuit.

The cut portion CT3 may electrically insulate the defective circuit unit from the first initialization voltage line portion VL3-1. The defective circuit unit may be isolated from other pixels by the cut portion CT3, and the defective circuit may be blocked from generating defects in the other pixels. In addition, even when the cut portion CT3 is formed, the remaining pixels other than a defective pixel may be applied with the first initialization voltage VINT (see FIG. 2 and FIG. 3) through the first initialization voltage line portions VL3-1 and the second initialization voltage line portions VL3-2 connected in a mesh form, and may be driven without being affected by the defective pixel.

Pixels according to an embodiment of the inventive concept may be electrically connected to initialization voltage line portions which are connected in a mesh form. When foreign matters are introduced between opposing capacitor electrodes of a capacitor in a pixel or there is a defect in the insulator between the opposing capacitor electrodes, the capacitor may be short-circuited. As a result, pixels disposed in the same row with the damaged pixel, thereby being electrically connected through the same initialization voltage line portion may be applied with an increased initialization voltage and be visually recognized to the outside as a dark point.

A method for repairing a display panel according to an embodiment of the inventive concept blocks a path through which an initialization voltage is applied between a damaged pixel and adjacent pixels, and thus may prevent a rise in the voltage of the adjacent pixel, and prevent a defect from visually recognized as dark points. As a result, the degradation in display quality of a display panel may be prevented, and the yield of a display panel manufacturing process may be improved.

Although the present invention has been described with reference to preferred embodiments of the present invention, it will be understood by those skilled in the art that various modifications and changes in form and details may be made therein without departing from the spirit and scope of the present invention as set forth in the following claims.

Accordingly, the technical scope of the present invention is not intended to be limited to the contents set forth in the detailed description of the specification, but is intended to be defined by the appended claims.

What is claimed is:

1. A method for repairing a display panel, the method comprising:

inspecting a display panel including pixels, arranged along a first direction and a second direction crossing the first direction, to detect a defective pixel among the pixels; and forming a cut portion on an initialization voltage line through which an initialization voltage is applied to the defective pixel, wherein the initialization voltage line comprises:

a first initialization voltage line portion extending in the first direction; and a second initialization voltage line portion extending in the second direction and disposed on a different layer than a layer of the first initialization voltage line portion, and wherein the defective pixel is isolated, through the cut portion, from the initialization voltage line through which the initialization voltage is applied.

2. The method of claim 1, wherein the initialization voltage line is electrically connected to the pixels to apply the initialization voltage, and each of the pixels comprises:

a circuit unit including transistors and a capacitor; and a light emitting element electrically connected to the circuit unit, and wherein among the transistors, an initialization transistor includes a semiconductor pattern connected to the initialization voltage line.

3. The method of claim 2, wherein the first initialization voltage line portion is formed as a single body with the semiconductor pattern of the initialization transistor, and the second initialization voltage line portion is intersecting the first initialization voltage line portion in a plan view and is electrically connected to the first initialization voltage line portion, and wherein the cut portion is formed such that a portion connected to the semiconductor pattern of the initialization transistor of the defective pixel is separated from the first initialization voltage line portion.

4. The method of claim 2, wherein the semiconductor pattern of the initialization transistor of the defective pixel extends from the initialization voltage line, and the cut portion is formed such that a portion of the semiconductor pattern of the defective pixel is cut.

5. A display panel comprising:

pixel units arranged along a first direction and a second direction intersecting the first direction; and an initialization voltage line electrically connected to the pixel units to apply an initialization voltage, wherein the initialization voltage line comprises:

first initialization voltage line portions extending in the first direction; and second initialization voltage line portions extending in the second direction and disposed on a different layer than a layer of the first initialization voltage line portions, and wherein a cut portion is defined on the initialization voltage line through which the initialization voltage is applied to a first pixel among the pixel units.

6. The display panel of claim 5, wherein the second initialization voltage line portions are electrically connected to the first initialization voltage line portions.

7. The display panel of claim 6, wherein the first initialization voltage line portions and the second initialization voltage line portions are connected to each other through contact holes.

8. The display panel of claim 6, wherein the first initialization voltage line portions and the second initialization voltage line portions comprise different materials.

9. The display panel of claim 8, wherein an electrical conductivity of the second initialization voltage line portions is greater than an electrical conductivity of the first initialization voltage line portions.

10. The display panel of claim 6, wherein each of the pixel units includes a pixel, and wherein the pixel of each of the pixel units comprises:

a circuit unit including transistors and a capacitor; and a light emitting element electrically connected to the circuit unit, and wherein an initialization transistor among the transistors includes a semiconductor pattern connected to a first initialization voltage line portion among the first initialization voltage line portions.

11. The display panel of claim 10, wherein the first initialization voltage line portion and the semiconductor pattern of the initialization transistor are formed as a single body on the same layer.

12. The display panel of claim 10, wherein the pixel units are arranged in pixel rows defined by pixel units arranged along the first direction, and the first initialization voltage line portions are respectively arranged along corresponding pixel rows.

13. The display panel of claim 12, wherein the pixel units are arranged in pixel columns arranged along the second direction, and the second initialization voltage line portions are respectively arranged in every n pixel columns, where the n is a natural number of 1 or greater.

14. The display panel of claim 12, wherein the first initialization voltage line portion is connected to a pixel row including the first pixel among the pixel rows, and wherein the cut portion is formed in the first initialization voltage line portion.

15. A display panel comprising:

pixel units arranged along a first direction and a second direction intersecting the first direction; and an initialization voltage line electrically connected to the pixel units to apply an initialization voltage, wherein a cut portion is defined on the initialization voltage line through which the initialization voltage is applied to a first pixel among the pixel units, wherein the initialization voltage line comprises:

first initialization voltage line portions extending in the first direction; and second initialization voltage line portions extending in the second direction and electrically connected to the first initialization voltage line portions, wherein a pixel of each of the pixel units comprises:

a circuit unit including transistors and a capacitor; and a light emitting element electrically connected to the circuit unit, wherein an initialization transistor among the transistors includes a semiconductor pattern connected to a first initialization voltage line portion among the first initialization voltage line portions, wherein the pixel units are arranged in pixel rows defined by pixel units arranged along the first direction, and the first initialization voltage line portions are respectively arranged along corresponding pixel rows, wherein the first initialization voltage line portion is connected to a pixel row including the first pixel among the pixel rows, and the cut portion is formed in the first initialization voltage line portion, wherein the cut portion comprises a first cut portion which is formed by cutting a first portion of the first initialization voltage line portion, and a second cut portion which is formed by cutting a second portion of the first initialization voltage line portion, and wherein an isolated portion of the first initialization voltage line portion positioned between the first cut portion and the second cut portion is connected to the first pixel.

16. The display panel of claim 15, wherein the first pixel is electrically insulated from the first initialization voltage line portion by the first cut portion and the second cut portion.

17. The display panel of claim 12, wherein the initialization transistor of the first pixel comprises a semiconductor pattern extending from the first initialization voltage line portion among the first initialization voltage line portions, and wherein the cut portion is formed in a portion of the semiconductor pattern of the first pixel, and the first pixel is electrically insulated from the first initialization voltage line portion by the cut portion.

18. The display panel of claim 10, wherein the pixel of each of the pixel units comprises:

a semiconductor pattern layer including the first initialization voltage line portions; and a conductive pattern layer disposed on the semiconductor pattern layer and including the second initialization voltage line portions, and wherein the cut portion is disposed not to overlap the conductive pattern layer in a plan view.

19. The display panel of claim 6, further comprising a driving voltage line extending in the second direction and electrically connected to the pixel units to apply a driving voltage, wherein the driving voltage line and the second initialization voltage line portions are disposed on the same layer.

20. The display panel of claim 19, wherein the driving voltage line is arranged spaced apart from the second initialization voltage line portions in the first direction.

* * * * *